US011409087B1

(12) United States Patent
Teraoka

(10) Patent No.: US 11,409,087 B1
(45) Date of Patent: Aug. 9, 2022

(54) ZOOM LENS

(71) Applicant: Changzhou Raytech Optronics Co., Ltd., Changzhou (CN)

(72) Inventor: Hiroyuki Teraoka, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/227,406

(22) Filed: Apr. 12, 2021

(30) Foreign Application Priority Data

Mar. 5, 2021 (JP) .............................. JP2021-035847

(51) Int. Cl.
*G02B 15/14* (2006.01)

(52) U.S. Cl.
CPC .............................. *G02B 15/145511* (2019.08)

(58) Field of Classification Search
CPC ..................... G02B 9/62; G02B 13/009; G02B 15/145511; G02B 15/146; G02B 15/1465; G02B 27/0025
See application file for complete search history.

(56) References Cited

FOREIGN PATENT DOCUMENTS

JP          2000275522 A    * 10/2000    ............. G02B 15/14

* cited by examiner

*Primary Examiner* — Jack Dinh
(74) *Attorney, Agent, or Firm* — W&G Law Group

(57) ABSTRACT

The present disclosure relates to optical lens, and provides a zoom lens including, from an object side to an image side in sequence: a first lens having a negative refractive power, a second lens having a positive refractive power, a third lens having a negative refractive power, a fourth lens having a positive refractive power, a fifth lens group having a negative refractive power; distances between adjacent two of the first lens, the second lens, the third lens, the fourth lens and the fifth lens group are variable in the direction of the optical axis; the fifth lens group including a fifth lens having a positive refractive power and a sixth lens having a negative refractive power; wherein the zoom lens satisfies conditions of: f_Tele/f_Wide>1.8; 4.78≤LB_Tele/LB_Wide≤6.20; 76.00≤v1≤82.00; 58.00≤v2≤78.00; and 76.00≤v6≤82.00.

5 Claims, 15 Drawing Sheets

ZOOM LENS

TECHNICAL FIELD

The present disclosure relates to a zoom lens which has a telescoping structure, particularly, to a zoom lens which is suitable for a smart phone or a camera using imaging elements such as Charge Coupled Device (CCD) or Complementary Metal-Oxide Semiconductor Sensor (CMOS sensor) for high pixels, and the like, and which becomes bright and has excellent optical performance when an F number ("Fno" hereinafter) is less than 2 at the wide angle end, which become miniature when a zoom ratio is more than 1.8 and a total track length (TTL) is less than 9.00 mm when contracted, and which includes five groups of lenses having six lenses.

BACKGROUND

In recent years, a zoom lens has been sought which has an Fno of less than 2 at the wide angle end, has a zoom ratio of more than 2.0 and excellent optical performance, and which becomes miniature when a barrel is contracted into the camera to reduce the TTL at the time of non-shooting.

A development for a zoom lens having six lenses is being advanced. As the zoom lens which includes six lenses, a lens which consists of three groups having six lenses is proposed in the US Patent Publication No. US2020/0241265A1 (Patent Document 1 hereinafter).

In the camera optical lens disclosed in Embodiments of Patent Document 1, a zoom ratio is more than 4.74. However, when the Fno is more than 2.552, the camera optical lens has insufficient brightness, and TTL is long when shooting and miniaturization thereof is insufficient.

SUMMARY

An objective of the present disclosure is to provide a zoom lens which has TTL of less than 9.00 mm and becomes miniature when contracted, which becomes bright when an Fno at the wide angle end is of less than 2.0 at the time of photographing, which has excellent optical performance and a zoom ratio of more than 1.8, and which includes five groups of lenses having six lenses.

In order to achieve the above objective, the inventor conceived in the present disclosure a zoom lens capable of solving the problem in the existing technology, by studying a ratio of an on-axis distance from an image-side surface of the six lens to an image surface at the telephoto end to an on-axis distance from an image-side surface of the six lens to an image surface at the wide angle end, an abbe of the first lens, an abbe of the second lens, an abbe of the six lens.

To solve the above technical problem, embodiments of the present disclosure provide a zoom lens. The zoom lens includes, from an object side to an image side in sequence: a first lens having a negative refractive power, a second lens having a positive refractive power, a third lens having a negative refractive power, a fourth lens having a positive refractive power, a fifth lens group having a negative refractive power; distances between adjacent two of the first lens, the second lens, the third lens, the fourth lens and the fifth lens group are variable in the direction of an optical axis; the fifth lens group includes a fifth lens having a positive refractive power and a sixth lens having a negative refractive power; and the zoom lens satisfies conditions of: $f\_Tele/f\_Wide > 1.8$ (1); $4.78 \leq LB\_Tele/LB\_Wide \leq 6.20$ (2); and $76.00 \leq v1 \leq 82.00$ (3); $58.00 \leq v2 \leq 78.00$ (4); $76.00 \leq v6 \leq 82.00$ (5); where f_Wide denotes a focal length of the zoom lens at the wide angle end; f_Tele denotes a focal length of the zoom lens at the telephoto end; LB_Wide denotes an on-axis distance from an image-side surface of the sixth lens to an image surface at the wide angel end; LB_Tele denotes an on-axis distance from an image-side surface of the sixth lens to an image surface at the telephoto end; v1 denotes an abbe number of the first lens; v2 denotes an abbe number of the second lens; and v6 denotes an abbe number of the sixth lens.

As an improvement, the zoom lens further satisfies a condition of: $10.00 \leq D12\_Wide/D12\_Tele \leq 20.00$ (6); where D12_Wide denotes an on-axis distance from an image-side surface of the first lens to an object-side surface of the second lens at the wide angle end; and D12_Tele denotes an on-axis distance from an image-side surface of the first lens to an object-side surface of the second lens at the telephoto end.

As an improvement, the zoom lens further satisfies a condition of: $0.68 \leq d5\_Wide/d5\_Tele \leq 1.20$ (7); where d5_Wide denotes an on-axis distance from an image-side surface of the second lens to an object-side surface of the third lens at the wide angle end, and d5_Tele denotes an on-axis distance from an image-side surface of the second lens to an object-side surface of the third lens at the telephoto end.

As an improvement, the zoom lens further satisfies a condition of: $0.55 \leq d7\_Wide/d7\_Tele \leq 0.75$ (8); where d7_Wide denotes an on-axis distance from an image-side surface of the third lens to an object-side surface of the fourth lens at the wide angle end, and d7_Tele denotes an on-axis distance from an image-side surface of the third lens to an object-side surface of the fourth lens at the telephoto end.

As an improvement, the zoom lens further satisfies a condition of: $15.00 \leq d9\_Wide/d9\_Tele \leq 22.50$ (9); where d9_Wide denotes an on-axis distance from an image-side surface of the fourth lens to an object-side surface of the fifth lens at the wide angle end, and d9_Tele denotes an on-axis distance from an image-side surface of the fourth lens to an object-side surface of the fifth lens at the telephoto end.

The present disclosure is advantageous in follows.

According to the present disclosure, the zoom lens is provided, which is suitable for a camera module of a smart phone or a WEB camera using imaging elements such as Charge Coupled Device (CCD) or Complementary Metal-Oxide Semiconductor Sensor (CMOS sensor) for high pixels, and the like, and which has TTL of less than 9.00 mm and becomes miniature when contracted, which has Fno of less than 2.0, a zoom ratio of more than 1.8 and excellent optical performance and becomes bright, and which includes five groups of lenses having six lenses.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

Figure 1:
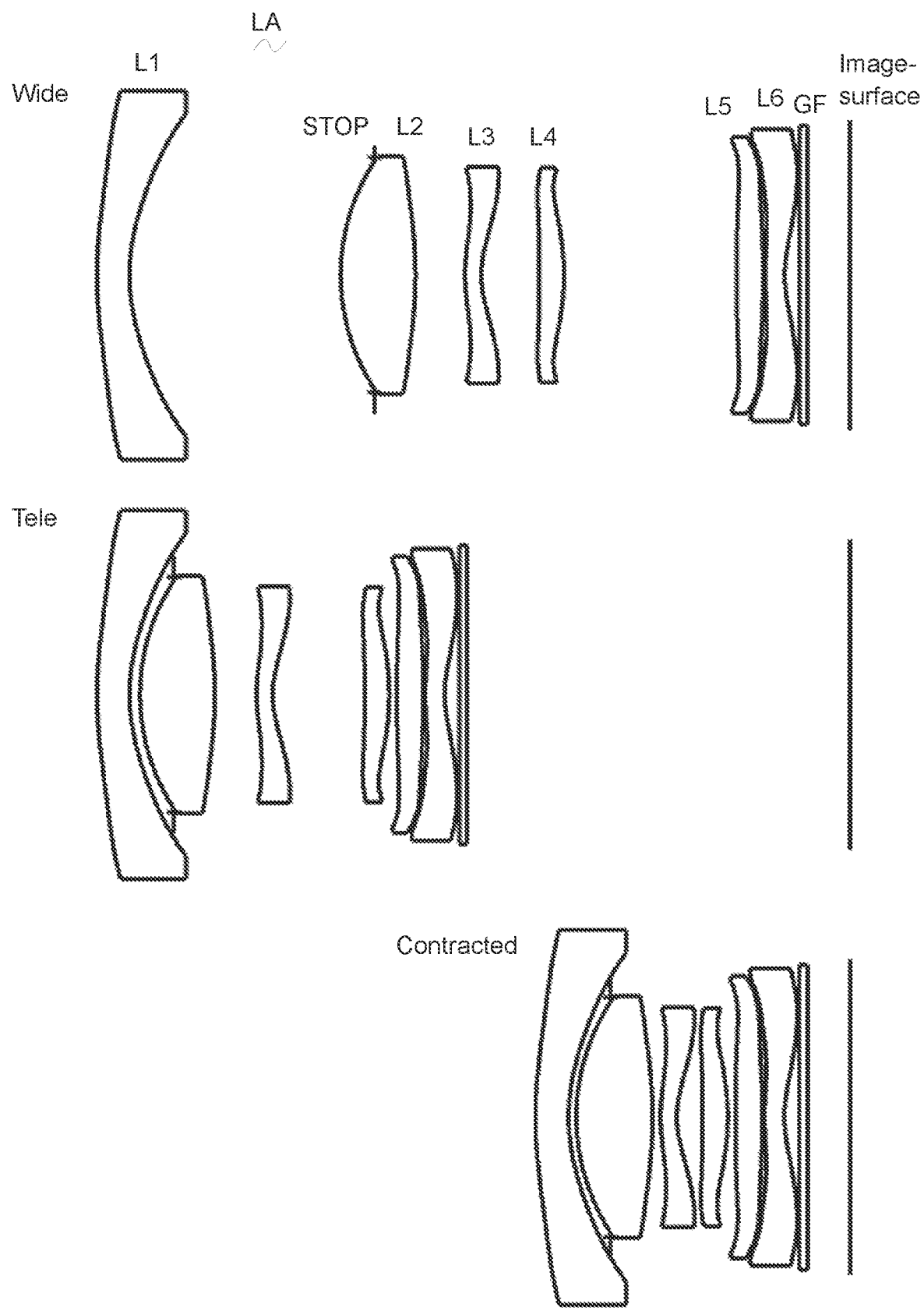
FIG. 1 is a schematic diagram of a structure of a zoom lens LA according to Embodiment 1 of the present disclosure.

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of a zoom lens in the present disclosure will be described. The zoom lens is a lens system which includes five groups of lenses having six lenses. The lens system includes, from an object side to an image side, a first lens L1, a second lens L2, a third lens L3, a fourth lens L4, a fifth lens group G5, where the fifth lens group includes a fifth lens L5 and a sixth lens L6. A glass plate GF is disposed between the sixth lens L6 and an image surface Si. The glass plate GF may include glass cover plates, various filters, and the like. In the present disclosure, the glass plate GF may be disposed at different positions or may be omitted.

In this embodiment, the first lens L1 has a negative refractive power, the second lens L2 has a positive refractive power, the third lens L3 has a negative refractive power, the fourth lens L4 has a positive refractive power, and the fifth lens group G5 has a negative refractive power. The fifth lens group G5 includes the fifth lens L5 and the sixth lens L6, where the fifth lens L5 has a positive refractive power, and the sixth lens L6 has a negative refractive power. For better correction to various distortions, all the surfaces of the six lenses are set as aspheric.

The zoom lens LA satisfies a condition of:

$$f\_Tele/f\_Wide > 1.8 \quad (1)$$

Condition (1) specifies a zoom ratio of the zoom lens LA. Within the condition (1), correction to various distortions is facilitated, and meanwhile the zoom ratio is sufficient.

The zoom lens LA satisfies a condition of:

$$4.78 \leq LB\_Tele/LB\_Wide \leq 6.20 \quad (2)$$

Condition (2) specifies a ratio of an on-axis distance LB_Tele from an image-side surface S12 of the six lens L6 to an image surface at the telephoto end to an on-axis distance LB_Wide from an image-side surface S12 of the six lens L6 to an image surface at the wide angle end. Within the condition (2), miniaturization when contracted is facilitated, and meanwhile correction to various distortions is facilitated when Fno is less than 2.0 and the zoom ratio is more than 1.8 at the wide angle end.

The zoom LA satisfies a condition of:

$$76.00 \leq v1 \leq 82.00 \quad (3)$$

Condition (3) specifies an abbe number v1 of the first lens L1. Within the condition (3), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$58.00 \leq v2 \leq 78.00 \quad (4)$$

Condition (4) specifies an abbe number v2 of the second lens L2. Within the condition (4), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$76.00 \leq v6 \leq 82.00 \quad (5)$$

Condition (5) specifies an abbe number v6 of the sixth lens L6. Within the condition (5), miniaturization when contracted is facilitated, and meanwhile correction to various distortions is facilitated when Fno is less than 2.0 and the zoom ratio is more than 1.8 at the wide angle end.

The zoom LA satisfies a condition of:

$$10.00 \leq D12\_Wide/D12\_Tele \leq 20.00 \quad (6)$$

Condition (6) specifies a ratio of an on-axis distance D12 Wide from an image-side surface S2 of the first lens L1 to an object-side surface S3 of the second lens L2 at the wide angle end to an on-axis distance D12 Tele from an image-side surface S2 of the first lens L1 to an object-side surface S3 of the second lens L2 at the telephoto end. Within the condition (6), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$0.68 \leq d5\_Wide/d5\_Tele \leq 1.20 \qquad (7)$$

Condition (7) specifies a ratio of an on-axis d5_Wide distance from an image-side surface S4 of the second lens L2 to an object-side surface S5 of the third lens L3 at the wide angle end to an on-axis distance d5 Tele from an image-side surface S4 of the second lens L2 to an object-side surface S5 of the third lens L3 at the telephoto end. Within the condition (7), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$0.55 \leq d7\_Wide/d7\_Tele \leq 0.75 \qquad (8)$$

Condition (8) specifies a ratio of an on-axis distance d7_Wide from an image-side surface S6 of the third lens L3 to an object-side surface S7 of the fourth lens L4 at the wide angle end to an on-axis distance d7 Tele from an image-side surface S6 of the third lens L3 to an object-side surface S7 of the fourth lens L4 at the telephoto end. abbe number of the first lens L1. Within the condition (8), miniaturiztaion when contracted is facilitated, and meanwhile correction to various distortions is facilitated when Fno is less than 2.0 and the zoom ratio is more than 1.8 at the wide angle end.

The zoom lens LA satisfies a condition of:

$$15.00 \leq d9\_Wide/d9\_Tele \leq 22.50 \qquad (9)$$

Condition (9) specifies a ratio of an on-axis distance d9_Wide from an image-side surface S8 of the fourth lens L4 to an object-side surface S9 of the fifth lens L5 at the wide angle end to an on-axis distance d9 Tele from an image-side surface S8 of the fourth lens L4 to an object-side surface S9 of the fifth lens L5 at the telephoto. Within the condition (9), miniaturization when contracted is facilitated, and meanwhile correction to various distortions is facilitated when Fno is less than 2.0 and the zoom ratio is more than 1.8 at the wide angle end.

With the five groups of lenses having six lenses included in the zoo lens LA satisfying the above structure and conditions respectively, the zoom lens LA which is obtained has TTL of less than 9.00 mm and becomes miniature when contracted, which has Fno of less than 2.0, a zoom ratio of more than 1.8 and an excellent optical performance and becomes bright, and which includes five groups of lenses having six lenses.

EMBODIMENTS

The zoom lens LA will be further described with reference to the following examples. Symbols used in various examples are shown as follows. It should be noted that the distance, central curvature radius, and on-axis thickness are all in units of mm.

f: focal length of the zoom lens;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
fG5: combined focal length of the fifth lens group G5;
FNO: ratio of an effective focal length and an entrance pupil diameter of the zoom lens;
2ω: full viewing angle;
STOP: aperture;
R: curvature radius of an optical surface (central curvature radius in the condition of the lens);
R1: central curvature radius of the object-side surface S1 of the first lens L1;
R2: central curvature radius of the image-side surface S2 of the first lens L1;
R3: central curvature radius of the object-side surface S3 of the second lens L2;
R4: central curvature radius of the image-side surface S4 of the second lens L2;
R5: central curvature radius of the object-side surface S5 of the third lens L3;
R6: central curvature radius of the image-side surface S6 of the third lens L3;
R7: central curvature radius of the object-side surface S7 of the fourth lens L4;
R8: central curvature radius of the image-side surface S8 of the fourth lens L4;
R9: central curvature radius of the object-side surface S9 of the fifth lens L5;
R10: central curvature radius of the image-side surface S10 of the fifth lens L5;
R11: central curvature radius of the object-side surface S11 of the sixth lens L6;
R12: central curvature radius of the image-side surface S12 of the sixth lens L6;
R13: central curvature radius of an object-side surface S13 of the glass plate GF;
R14: central curvature radius of an image-side surface S14 of the glass plate GF;
d: on-axis thickness of a lens or an on-axis distance between lenses;
d1: on-axis thickness of the first lens L1;
D12: on-axis distance from the image-side surface S2 of the first lens L1 to the object-side surface S3 of the second lens L2;
d2: on-axis distance from the image-side surface S2 of the first lens L1 to the aperture STOP;
d3: on-axis distance from the aperture STOP to the object-side surface S3 of the second lens L2;
d4: on-axis thickness of the second lens L2;
d5: on-axis distance from the image-side surface S4 of the second lens L2 to the object-side surface S5 of the third lens L3;
d6: on-axis thickness of the third lens L3;
d7: on-axis distance from the image-side surface S6 of the third lens L3 to the object-side surface S7 of the fourth lens L4;
d8: on-axis thickness of the fourth lens L4;
d9: on-axis distance from the image-side surface S8 of the fourth lens L4 to the object-side surface S9 of the fifth lens L5;
d10: on-axis thickness of the fifth lens L5;
d11: on-axis distance from the image-side surface S10 of the fifth lens L5 to the object-side surface S11 of the sixth lens L6;
d12: on-axis thickness of the sixth lens L6;
d13: on-axis distance from the image-side surface S12 of the sixth lens L6 to the object-side surface S13 of the glass plate GF;

d14: on-axis thickness of the glass plate GF;

d15: on-axis distance from the image-side surface S14 of the glass plate GF to the object-side surface S15 of the image surface;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

ndg: refractive index of the d line of the glass plate GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the glass plate GF;

TTL: Total optical length (on-axis distance from the object side surface S1 of the first lens L1 to the image surface of the zoom lens) in mm;

LB: on-axis distance from the image-side surface S12 of the sixth lens L6 to the image surface.

Embodiment 1

FIG. 1 is a schematic diagram of a structure of the zoom LA according to Embodiment 1 of the present disclosure. Table 1 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 2 shows the values of A, B, C, D and E when contracted or photographing. Table 3 shows the conic coefficient k and the aspheric surface coefficients. Table 4 shows values of Fno, 2ω, f, TTL, LB, f1, f2, f3, f4, fG5, f5, f6, IH and zoom ratio.

The design data of the zoom LA in Embodiment 1 of the present disclosure are shown in Table 1.

TABLE 1

|  |  | R |  | d |  | nd |  | vd |  | effective radius (mm) |
|---|---|---|---|---|---|---|---|---|---|---|
| S1 | R1 | 9.61540 | d1 | 0.848 | nd1 | 1.4959 | v1 | 81.655 |  | 4.789 |
| S2 | R2 | 4.78994 | D12 d2 | A |  |  |  |  |  | 4.201 |
| Stop |  | ∞ | d3 | −0.875 |  |  |  |  |  | 3.058 |
| S3 | R3 | 5.43455 | d4 | 1.945 | nd2 | 1.5806 | v2 | 60.079 |  | 3.085 |
| S4 | R4 | −10.30283 | d5 | B |  |  |  |  |  | 3.068 |
| S5 | R5 | 4.22326 | d6 | 0.418 | nd3 | 1.6700 | v3 | 19.392 |  | 2.804 |
| S6 | R6 | 2.37762 | d7 | C |  |  |  |  |  | 2.792 |
| S7 | R7 | −72.30089 | d8 | 0.643 | nd4 | 1.5438 | v4 | 56.029 |  | 2.792 |
| S8 | R8 | −6.42171 | d9 | D |  |  |  |  |  | 2.768 |
| S9 | R9 | −422.21458 | d10 | 0.687 | nd5 | 1.6700 | v5 | 19.392 |  | 3.482 |
| S10 | R10 | −16.16554 | d11 | 0.050 |  |  |  |  |  | 3.599 |
| S11 | R11 | 6.61558 | d12 | 0.507 | nd6 | 1.4959 | v6 | 81.655 |  | 3.617 |
| S12 | R12 | 2.97312 | d13 | 0.380 |  |  |  |  |  | 3.798 |
| S13 | R13 | ∞ | d14 | 0.210 | ndg | 1.5168 | vg | 64.167 |  | 3.868 |
| S14 | R14 | ∞ | d15 | E |  |  |  |  |  | 3.890 |

Reference wavelength = 587.6 nm

TABLE 2

|  | Photographing |  | |
|---|---|---|---|
|  | Wide | Tele | Contracted |
| A | 6.374 | 1.150 | 1.075 |
| B | 1.292 | 1.087 | 0.200 |
| C | 1.511 | 2.391 | 0.654 |
| D | 4.498 | 0.200 | 0.200 |
| E | 1.114 | 9.960 | 0.890 |

TABLE 3

|  | Conic coefficient | Aspheric surface coefficients | | | |
|---|---|---|---|---|---|
|  | k | A4 | A6 | A8 | A10 |
| S1 | 0.0000E+00 | −3.7161E−03 | 2.1150E−04 | −8.6464E−06 | 3.2195E−07 |
| S2 | 0.0000E+00 | −5.0043E−03 | 2.7486E−04 | −2.2796E−05 | 1.9983E−06 |
| S3 | −4.1073E−01 | 4.8828E−04 | −2.6565E−05 | 1.2402E−05 | −2.4815E−06 |
| S4 | 0.0000E+00 | 2.6570E−03 | −5.5477E−05 | 7.0596E−06 | −5.7191E−06 |
| S5 | 0.0000E+00 | −4.3942E−02 | 1.0026E−02 | −2.0167E−03 | 2.9806E−04 |
| S6 | −4.1210E+00 | −2.6213E−02 | 7.1515E−03 | −1.6809E−03 | 2.8826E−04 |
| S7 | 0.0000E+00 | −3.2293E−03 | 8.8623E−04 | −3.9750E−04 | 1.3776E−04 |
| S8 | 2.1814E−01 | 1.7419E−03 | 3.3061E−04 | 5.2942E−05 | −1.0663E−05 |
| S9 | 0.0000E+00 | 9.8434E−03 | −4.1050E−03 | 1.0649E−03 | −1.7264E−04 |

TABLE 3-continued

| | | | | |
|---|---|---|---|---|
| S10 | 0.0000E+00 | 1.4996E-02 | -7.5983E-03 | 2.0379E-03 | -2.9367E-04 |
| S11 | -5.0000E+01 | -1.8444E-02 | 5.4669E-04 | 6.5146E-04 | -1.1815E-04 |
| S12 | -1.0143E+01 | -1.4135E-02 | 2.5607E-03 | -2.9863E-04 | 1.8766E-05 |

| | Conic coefficient | Aspheric surface coefficients | | |
|---|---|---|---|---|
| | k | A12 | A14 | A16 |
| S1 | 0.0000E+00 | -9.9365E-09 | 2.2247E-10 | -2.7730E-12 |
| S2 | 0.0000E+00 | -1.4272E-07 | 6.0406E-09 | -1.1574E-10 |
| S3 | -4.1073E-01 | 1.6043E-07 | 6.0347E-09 | -9.7092E-10 |
| S4 | 0.0000E+00 | 1.0816E-06 | -8.7358E-08 | 2.3508E-09 |
| S5 | 0.0000E+00 | -2.9519E-05 | 1.6781E-06 | -4.0053E-08 |
| S6 | -4.1210E+00 | -3.2808E-05 | 2.1394E-06 | -5.9001E-08 |
| S7 | 0.0000E+00 | -1.8645E-05 | 1.0372E-06 | -1.9847E-08 |
| S8 | 2.1814E-01 | 7.9451E-06 | -1.2973E-06 | 5.9210E-08 |
| S9 | 0.0000E+00 | 1.6328E-05 | -8.4011E-07 | 1.8139E-08 |
| S10 | 0.0000E+00 | 2.3324E-05 | -9.9462E-07 | 1.8163E-08 |
| S11 | -5.0000E+01 | 8.3999E-06 | -2.6527E-07 | 3.0971E-09 |
| S12 | -1.0143E+01 | -6.0983E-07 | 9.6600E-09 | -5.9281E-11 |

Herein, k denotes a conic coefficient, A4, A6, A8, A10, A12, A14, A16 denote aspheric surface coefficients.

$$y = (x^2/R)/[1+\{1-(k+1)(x^2/R^2)\}^{1/2}] + A4x^4 + A6x^6 + A8x^8 + A10x^{10} + A12x^{12} + A14x^{14} + A16x^{16} \quad (10)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (10). However, the present disclosure is not limited to the aspherical polynomials forms shown the formula (10).

TABLE 4

| | Wide | Tele | |
|---|---|---|---|
| Fno | 1.94 | 3.11 | |
| 2ω (°) | 46.96 | 24.13 | |
| f (mm) | 9.252 | 18.503 | |
| | Wide | Tele | Contracted |
| TTL (mm) | 19.600 | 19.600 | 7.831 |
| LB (mm) | 1.704 | 10.550 | 1.480 |
| f1 (mm) | -20.436 | | |
| f2 (mm) | 6.419 | | |
| f3 (mm) | -8.931 | | |
| f4 (mm) | 12.915 | | |
| fG5 (mm) | -22.052 | | |
| f5 (mm) | 25.069 | | |
| f6 (mm) | -11.415 | | |
| IH (mm) | 4.000 | | |
| Zoom ratio | 2.000 | | |

In the subsequent Table 21, various parameters of Embodiments 1, 2, 3, 4 and 5 and values corresponding to the parameters specified in the above conditions (1) to (9) are shown.

As shown in Table 21, Embodiment 1 satisfies the conditions (1) to (9).

Figure 2:
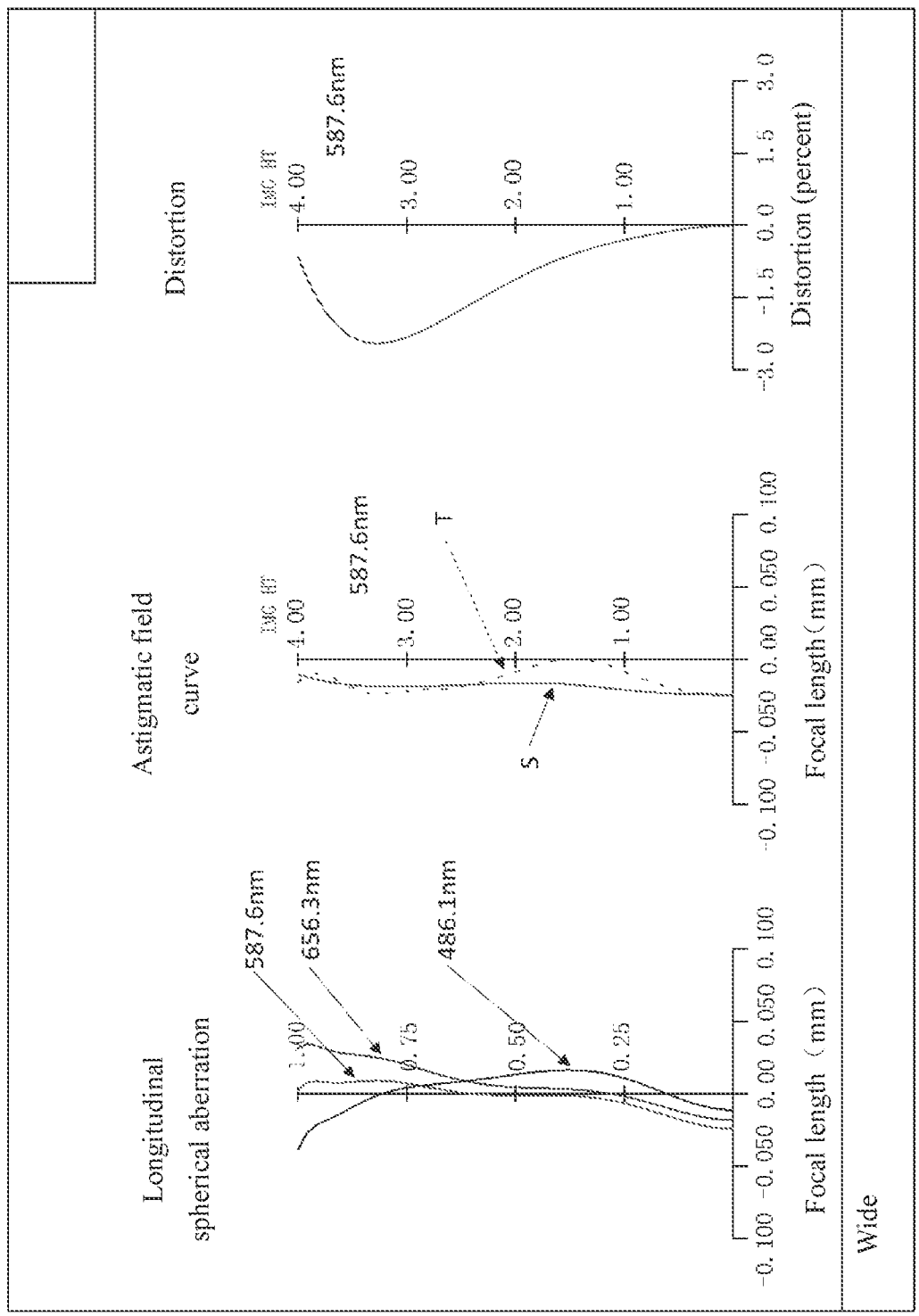
FIG. 2 is a schematic diagram showing longitudinal spherical aberrations, astigmatic field curves and distortions of the zoom lens LA at the wide angle end according to Embodiment 1 of the present disclosure.
Figure 3:
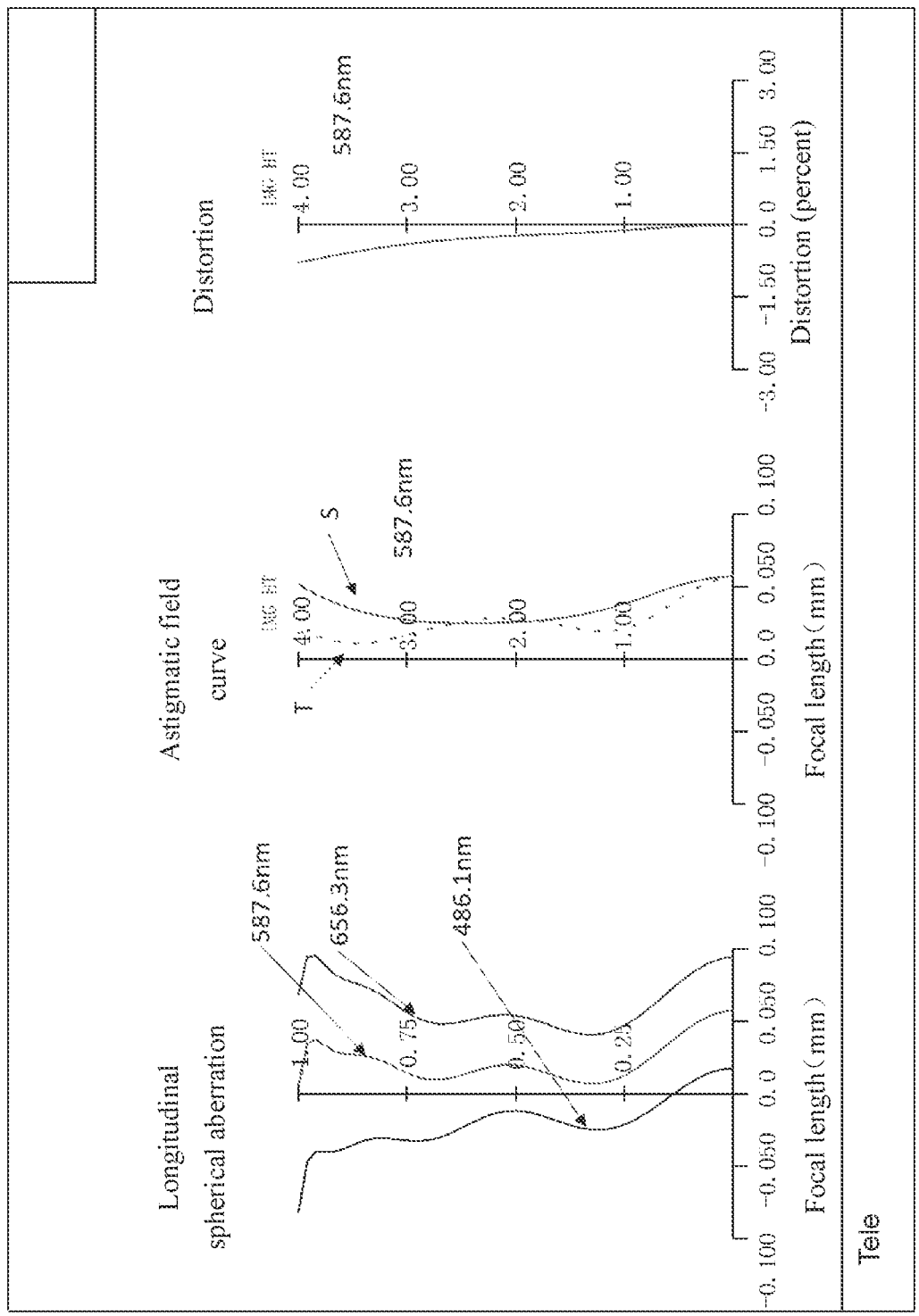
FIG. 3 is a schematic diagram showing longitudinal spherical aberrations, astigmatic field curves and distortions of the zoom lens LA at the telephoto end according to Embodiment 1 of the present disclosure.

FIG. 2 is a schematic diagram showing longitudinal spherical aberrations, astigmatic field curves and distortions of the zoom lens LA at the wide angle end according to Embodiment 1 of the present disclosure. FIG. 3 is a schematic diagram showing longitudinal spherical aberrations, astigmatic field curves and distortions of the zoom lens LA at the telephoto end according to Embodiment 1 of the present disclosure. It should be noted that a field curvature S is a field curvature in a sagittal direction, and T is a field curvature in a tangential direction which are also employed in embodiments 2, 3, 4, and 5. It can be known that the zoom lens becomes miniature with TTL equal to 7.831 and becomes bright with Fno equal to 1.94, and has a zoom ratio equal to 2.000 at the wide angle end and has excellent optical performance as shown in FIG. 2 and FIG. 3 in Embodiment 1 of the present disclosure.

Embodiment 2

Figure 4:
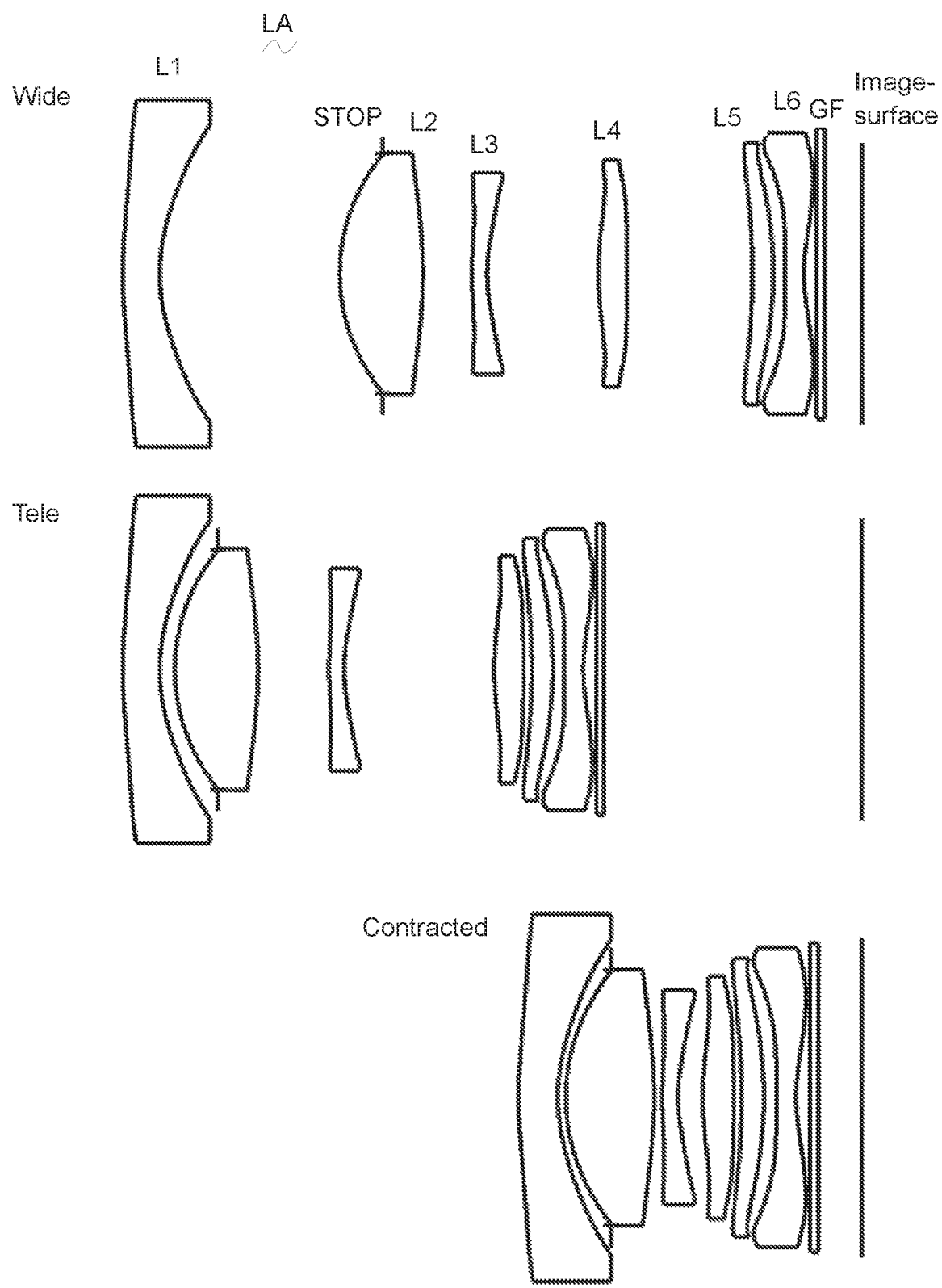
FIG. 4 is a schematic diagram of a structure of a zoom lens LA according to Embodiment 2 of the present disclosure.

FIG. 4 is a schematic diagram of a structure of the zoom LA according to Embodiment 2 of the present disclosure. Table 5 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 6 shows the values of A, B, C, D and E when contracted or photographing. Table 7 shows the conic coefficient k and the aspheric surface coefficients. Table 8 shows values of Fno, 2ω, f, TTL, LB, f1, f2, f3, f4, fG5, f5, f6, IH and zoom ratio.

TABLE 5

| | | R | d | | nd | | vd | effective radius (mm) |
|---|---|---|---|---|---|---|---|---|
| S1 | R1 | 11.54916 | d1 | 0.980 | nd1 | 1.4959 | v1 | 81.655 | 4.604 |
| S2 | R2 | 4.52385 | D12 | d2 | A | | | | 3.947 |
| Stop | | ∞ | | d3 | -1.131 | | | | 3.190 |
| S3 | R3 | 4.79882 | | d4 | 2.206 | nd2 | 1.5806 | v2 | 60.079 | 3.202 |
| S4 | R4 | -12.36368 | | d5 | B | | | | 3.127 |

TABLE 5-continued

|  |  | R | d |  | nd |  | vd | effective radius (mm) |
|---|---|---|---|---|---|---|---|---|
| S5 | R5 | 8.18784 | d6 | 0.400 | nd3 | 1.6700 | v3 19.392 | 2.689 |
| S6 | R6 | 3.84986 | d7 | C |  |  |  | 2.500 |
| S7 | R7 | 8.58565 | d8 | 0.770 | nd4 | 1.5438 | v4 56.029 | 2.990 |
| S8 | R8 | −65.64031 | d9 | D |  |  |  | 3.025 |
| S9 | R9 | −16.92466 | d10 | 0.557 | nd5 | 1.6700 | v5 19.392 | 3.481 |
| S10 | R10 | −8.47675 | d11 | 0.309 |  |  |  | 3.476 |
| S11 | R11 | 85.55021 | d12 | 0.500 | nd6 | 1.4959 | v6 81.655 | 3.705 |
| S12 | R12 | 4.55212 | d13 | 0.340 |  |  |  | 3.741 |
| S13 | R13 | ∞ | d14 | 0.210 | ndg | 1.5168 | vg 64.167 | 3.845 |
| S14 | R14 | ∞ | d15 | E |  |  |  | 3.871 |

Reference wavelength = 587.6 nm

TABLE 6

|  | Photographing | | |
|---|---|---|---|
|  | Wide | Tele | Contracted |
| A | 5.904 | 1.533 | 1.333 |
| B | 1.301 | 1.884 | 0.200 |
| C | 2.951 | 3.988 | 0.620 |
| D | 3.315 | 0.221 | 0.200 |
| E | 0.989 | 6.835 | 0.890 |

TABLE 7

| | Conic coefficient | Aspheric surface coefficients | | | |
|---|---|---|---|---|---|
| | k | A4 | A6 | A8 | A10 |
| S1 | 0.0000E+00 | −4.3273E−03 | 3.0195E−04 | −1.3551E−05 | 3.9245E−07 |
| S2 | 0.0000E+00 | −6.2743E−03 | 3.7607E−04 | −2.5241E−05 | 1.4655E−06 |
| S3 | −5.5335E−01 | 2.6661E−04 | −2.7405E−05 | 1.8364E−05 | −4.2766E−06 |
| S4 | 0.0000E+00 | 1.3787E−03 | 1.5428E−04 | −6.0202E−05 | 1.0644E−05 |
| S5 | 0.0000E+00 | −2.6907E−02 | 6.5909E−03 | −1.3197E−03 | 2.1250E−04 |
| S6 | −3.8955E+00 | −2.5433E−02 | 7.8649E−03 | −1.9084E−03 | 3.7605E−04 |
| S7 | 0.0000E+00 | −3.6049E−03 | −1.8631E−04 | −7.8918E−05 | 2.1912E−05 |
| S8 | 4.6350E+01 | −2.9343E−04 | −4.3523E−04 | 3.9347E−05 | −1.0555E−05 |
| S9 | 0.0000E+00 | 4.3758E−03 | −1.5179E−03 | 1.7440E−04 | 3.8823E−06 |
| S10 | 0.0000E+00 | 1.1313E−02 | −3.6859E−03 | 4.3334E−04 | 8.7735E−06 |
| S11 | −4.3256E+0 1 | −1.0058E−02 | 7.6167E−04 | −4.6670E−04 | 1.6076E−04 |
| S12 | −1.5106E+01 | −6.3607E−03 | 2.8458E−04 | −1.8017E−05 | 1.1228E−05 |

| | Conic coefficient | Aspheric surface coefficients | | |
|---|---|---|---|---|
| | k | A12 | A14 | A16 |
| S1 | 0.0000E+00 | −4.3114E−09 | −9.6807E−11 | 2.4063E−12 |
| S2 | 0.0000E+00 | −9.2753E−08 | 4.2407E−09 | −1.0222E−10 |
| S3 | −5.5335E−01 | 5.2175E−07 | −3.1865E−08 | 7.6092E−10 |
| S4 | 0.0000E+00 | −1.0830E−06 | 5.9866E−08 | −1.4064E−09 |
| S5 | 0.0000E+00 | −2.3490E−05 | 1.5289E−06 | −4.3300E−08 |
| S6 | −3.8955E+00 | −5.0004E−05 | 3.8761E−06 | −1.2844E−07 |
| S7 | 0.0000E+00 | −3.5289E−06 | 3.3353E−07 | −1.0855E−08 |
| S8 | 4.6350E+01 | 1.8938E−06 | −1.5287E−07 | 6.3304E−09 |
| S9 | 0.0000E+00 | −1.9526E−06 | 1.1519E−07 | −1.7113E−09 |
| S10 | 0.0000E+00 | −5.5236E−06 | 3.8284E−07 | −7.6534E−09 |
| S11 | −4.3256E+01 | −2.2796E−05 | 1.4432E−06 | −3.3666E−08 |
| S12 | −1.5106E+01 | −2.0799E−06 | 1.4161E−07 | −3.2697E−09 |

TABLE 8

|  | Wide | Tele | Contracted |
|---|---|---|---|
| Fno | 1.96 | 3.10 | |
| 2ω (°) | 47.21 | 24.65 | |
| f (mm) | 9.261 | 18.525 | |
| TTL (mm) | 19.600 | 19.600 | 8.383 |
| LB (mm) | 1.539 | 7.385 | 1.440 |
| f1 (mm) | −15.723 | | |
| f2 (mm) | 6.249 | | |
| f3 (mm) | −11.261 | | |
| f4 (mm) | 14.013 | | |
| fG5 (mm) | −16.384 | | |
| f5 (mm) | 24.692 | | |
| f6 (mm) | −9.715 | | |
| IH (mm) | 4.000 | | |
| Zoom ratio | 2.000 | | |

As shown in Table 21, Embodiment 2 satisfies the conditions (1) to (9).

Figure 5:
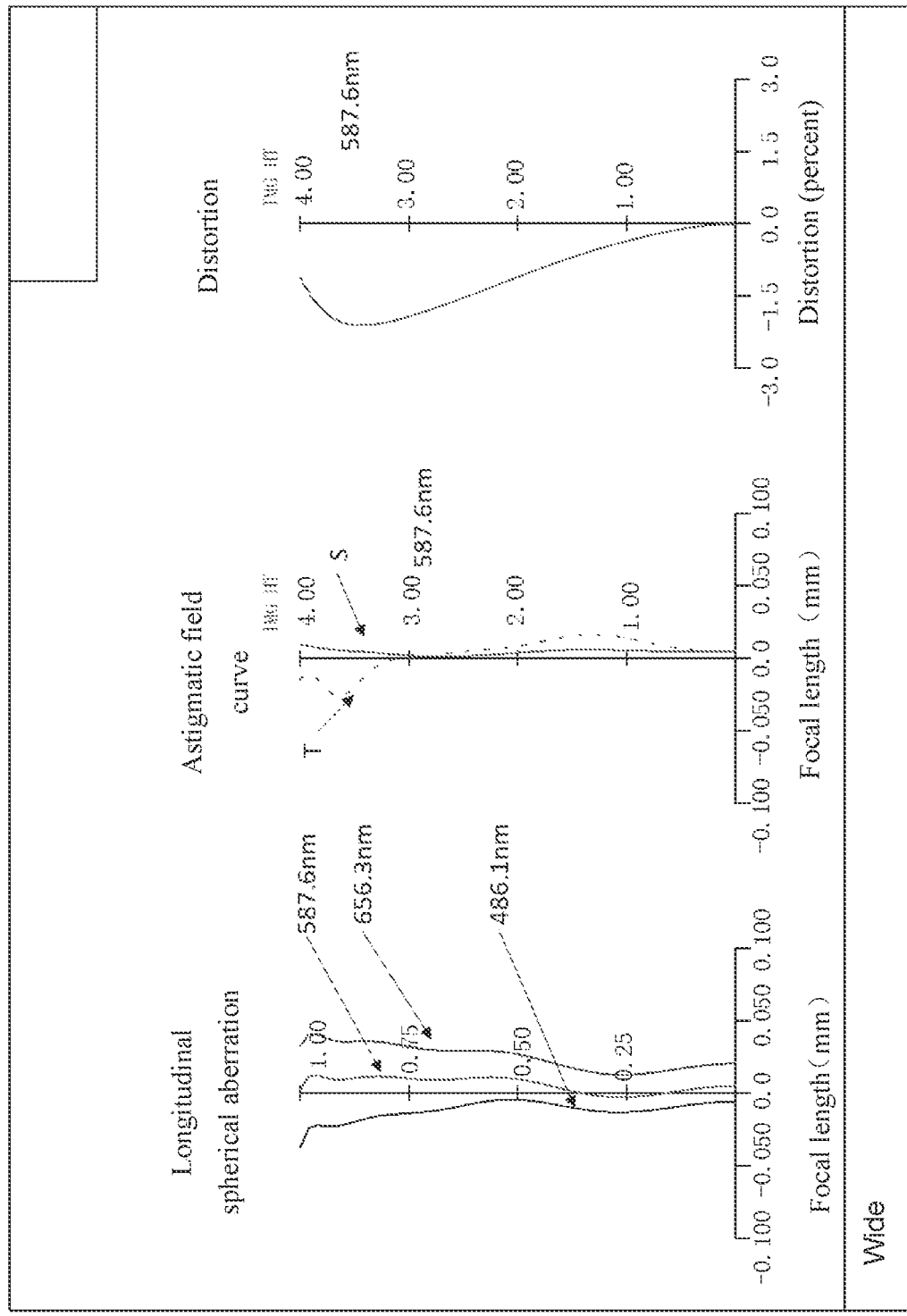
FIG. 5 is a schematic diagram showing longitudinal spherical aberrations, astigmatic field curves and distortions of the zoom lens LA at the wide angle end according to Embodiment 2 of the present disclosure.
Figure 6:
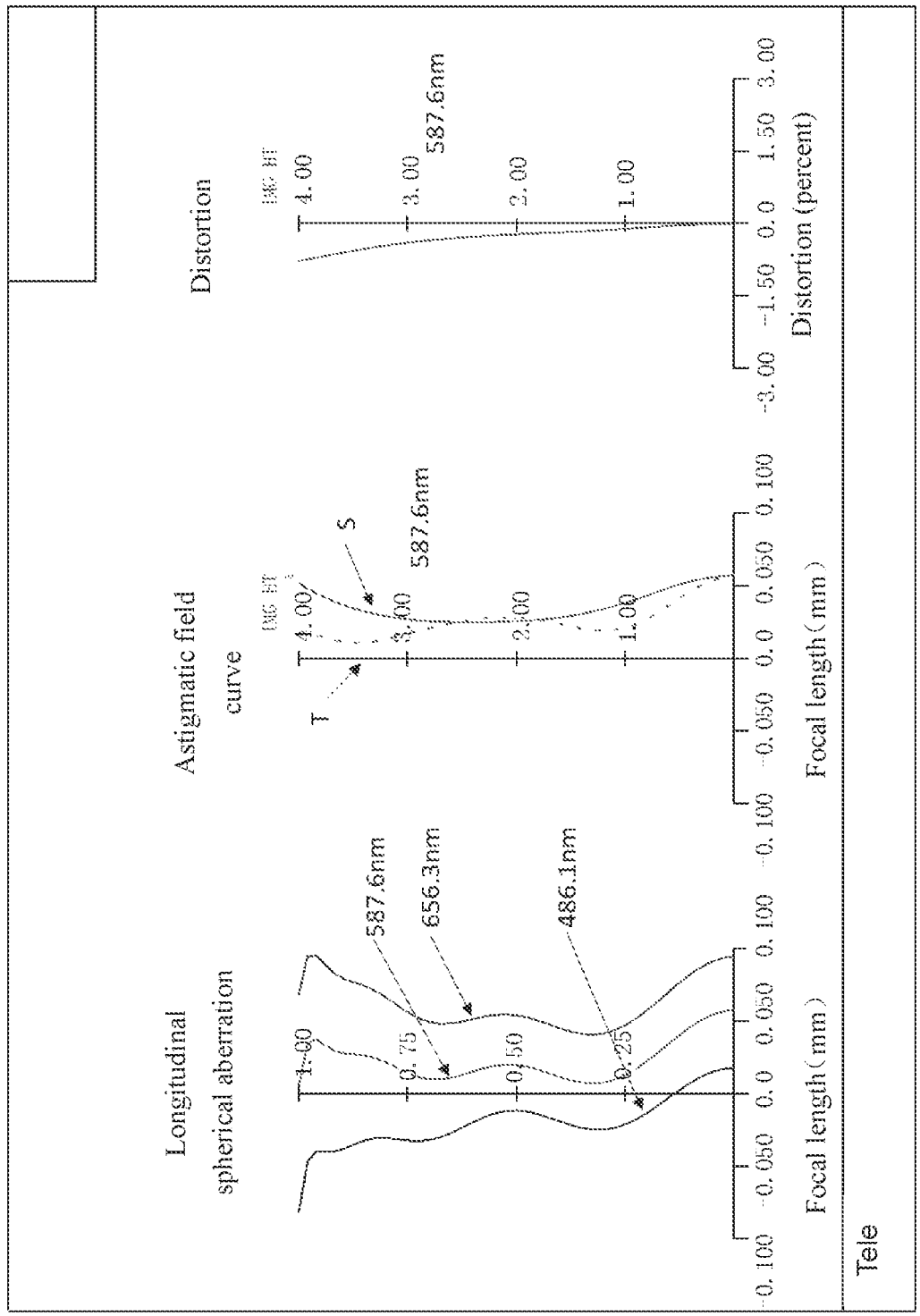
FIG. 6 is a schematic diagram showing longitudinal spherical aberrations, astigmatic field curves and distortions of the zoom lens LA at the telephoto end according to Embodiment 2 of the present disclosure.

FIG. 5 is a schematic diagram showing longitudinal spherical aberrations, astigmatic field curves and distortions of the zoom lens LA at the wide angle end according to Embodiment 2 of the present disclosure. FIG. 6 is a schematic diagram showing longitudinal spherical aberrations, astigmatic field curves and distortions of the zoom lens LA at the telephoto end according to Embodiment 2 of the present disclosure. It can be known that the zoom lens becomes miniature with TTL equal to 8.383 and becomes bright with Fno equal to 1.96 and has a zoom ratio equal to 2.000 at the wide angle end and has excellent optical performance as shown in FIG. 5 and FIG. 6 in Embodiment 2 of the present disclosure.

Embodiment 3

Figure 7:
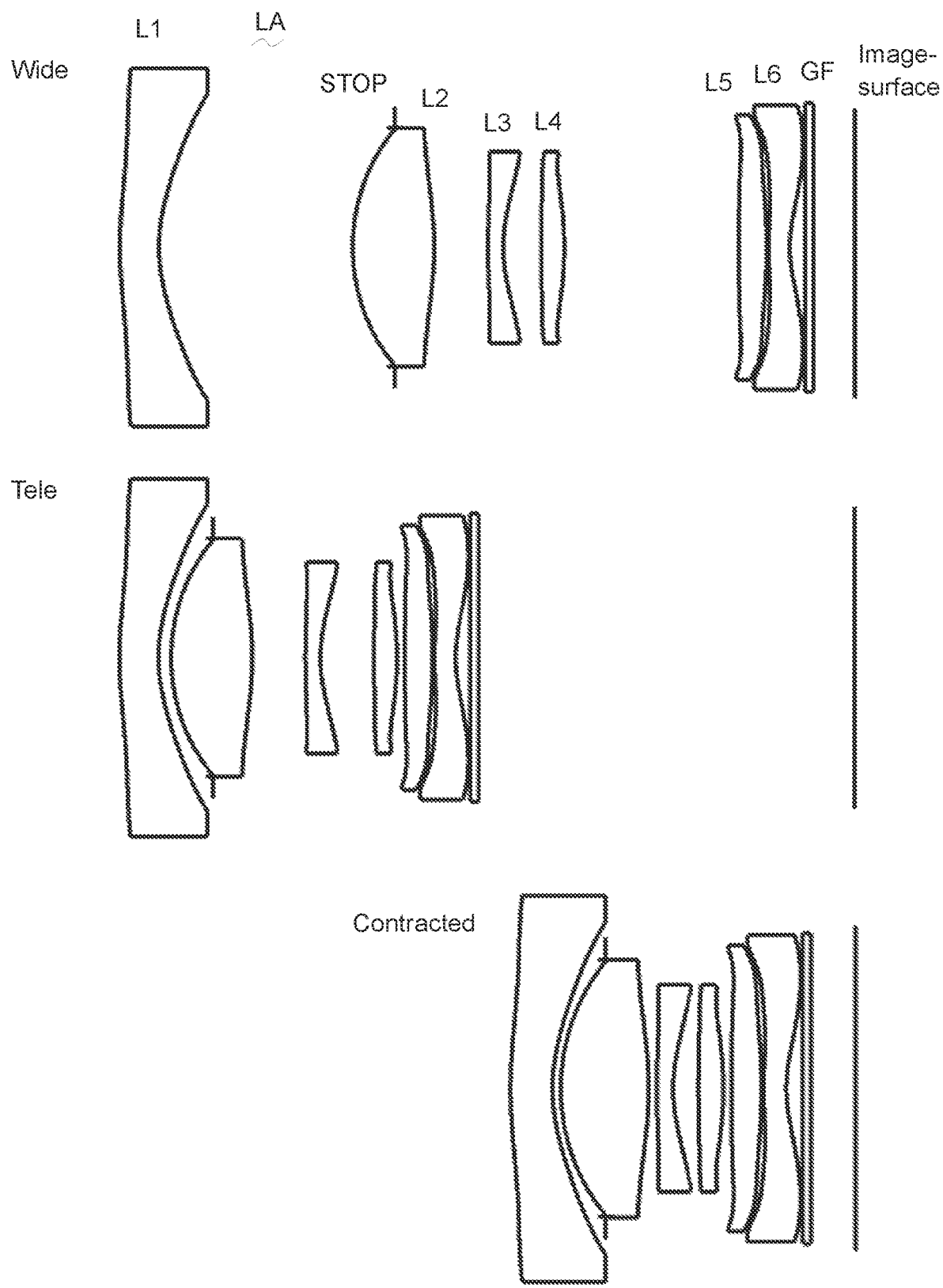
FIG. 7 is a schematic diagram of a structure of a zoom lens LA according to Embodiment 3 of the present disclosure.

FIG. 7 is a schematic diagram of a structure of the zoom LA according to Embodiment 3 of the present disclosure. Table 9 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 10 shows the values of A, B, C, D and E when contracted or photographing. Table 11 shows the conic coefficient k and the aspheric surface coefficients. Table 12 shows values of Fno, 2ω, f, TTL, LB, f1, f2, f3, f4, fG5, f5, f6, IH and zoom ratio.

TABLE 9

|  |  | R | d |  |  | nd |  | vd | effective radius (mm) |
|---|---|---|---|---|---|---|---|---|---|
| S1 | R1 | 10.58008 | d1 |  | 1.042 | nd1 | 1.4959 | v1 | 81.655 | 4.784 |
| S2 | R2 | 4.52948 | D12 | d2 | A |  |  |  | 4.108 |
| Stop |  | ∞ |  | d3 | −1.107 |  |  |  | 3.177 |
| S3 | R3 | 5.07855 |  | d4 | 2.168 | nd2 | 1.5806 | v2 | 60.079 | 3.187 |
| S4 | R4 | −8.45974 |  | d5 | B |  |  |  | 3.062 |
| S5 | R5 | 16.45587 |  | d6 | 0.400 | nd3 | 1.6700 | v3 | 19.392 | 2.363 |
| S6 | R6 | 3.65515 |  | d7 | C |  |  |  | 2.441 |
| S7 | R7 | 25.36114 |  | d8 | 0.613 | nd4 | 1.5438 | v4 | 56.029 | 2.330 |
| S8 | R8 | −9.03460 |  | d9 | D |  |  |  | 2.337 |
| S9 | R9 | 133.73082 |  | d10 | 0.738 | nd5 | 1.6700 | v5 | 19.392 | 3.429 |
| S10 | R10 | −21.13099 |  | d11 | 0.050 |  |  |  | 3.332 |
| S11 | R11 | 6.66943 |  | d12 | 0.563 | nd6 | 1.4959 | v6 | 81.655 | 3.331 |
| S12 | R12 | 3.24530 |  | d13 | 0.410 |  |  |  | 3.791 |
| S13 | R13 | ∞ |  | d14 | 0.210 | ndg | 1.5168 | vg | 64.167 | 3.823 |
| S14 | R14 | ∞ |  | d15 | E |  |  |  | 3.848 |

Reference wavelength = 587.6 nm

TABLE 10

|  | Photographing | | Contracted |
|---|---|---|---|
|  | Wide | Tele |  |
| A | 6.273 | 1.440 | 1.310 |
| B | 1.444 | 1.413 | 0.200 |
| C | 1.018 | 1.425 | 0.643 |
| D | 4.656 | 0.207 | 0.200 |
| E | 1.122 | 10.028 | 0.890 |

TABLE 11

|  | Conic coefficient | Aspheric surface coefficients | | | |
|---|---|---|---|---|---|
|  | k | A4 | A6 | A8 | A10 |
| S1 | 0.0000E+00 | −4.4095E−03 | 2.0708E−04 | −3.9038E−06 | −1.9264E−07 |
| S2 | 0.0000E+00 | −6.3328E−03 | 2.7470E−04 | −1.7528E−05 | 1.1901E−06 |
| S3 | −3.6269E−01 | 4.9698E−04 | 9.1645E−06 | 5.8361E−06 | −1.8648E−06 |
| S4 | 0.0000E+00 | 5.7932E−03 | −4.6315E−04 | 4.4802E−05 | −4.1143E−06 |
| S5 | 0.0000E+00 | −1.0829E−02 | 3.3479E−03 | −8.3487E−04 | 1.3433E−04 |
| S6 | −4.0285E+00 | −1.4720E−02 | 4.4418E−03 | −1.0849E−03 | 1.7666E−04 |
| S7 | 0.0000E+00 | −6.8090E−03 | 4.4941E−04 | 1.9025E−04 | −5.2820E−07 |
| S8 | 4.1694E+00 | 5.6632E−04 | 2.3946E−04 | 2.1157E−04 | −1.1785E−05 |
| S9 | 0.0000E+00 | 3.6015E−03 | −2.2196E−03 | 8.3091E−04 | −1.6445E−04 |
| S10 | 0.0000E+00 | −7.2986E−03 | 2.0443E−03 | 1.4646E−04 | −9.7643E−05 |
| S11 | −7.2588E+00 | −4.4240E−02 | 1.2333E−02 | −1.9295E−03 | 1.8668E−04 |
| S12 | −7.5252E+00 | −1.5700E−02 | 3.2886E−03 | −4.7529E−04 | 4.0819E−05 |

TABLE 11-continued

| | Conic coefficient | Aspheric surface coefficients | | |
|---|---|---|---|---|
| | k | A12 | A14 | A16 |
| S1 | 0.0000E+00 | 2.0604E−08 | −7.4463E−10 | 9.9131E−12 |
| S2 | 0.0000E+00 | −8.9260E−08 | 4.3084E−09 | −1.0036E−10 |
| S3 | −3.6269E−01 | 3.0197E−07 | −2.3163E−08 | 7.0698E−10 |
| S4 | 0.0000E+00 | 3.2966E−07 | −1.9572E−08 | 6.0139E−10 |
| S5 | 0.0000E+00 | −1.3718E−05 | 8.2984E−07 | −2.2114E−08 |
| S6 | −4.0285E+00 | −1.9160E−05 | 1.2721E−06 | −3.6712E−08 |
| S7 | 0.0000E+00 | −7.6718E−06 | 9.7243E−07 | −4.1555E−08 |
| S8 | 4.1694E+00 | −1.0882E−06 | −3.6653E−08 | 7.6618E−09 |
| S9 | 0.0000E+00 | 1.7312E−05 | −9.4394E−07 | 2.0940E−08 |
| S10 | 0.0000E+00 | 1.2379E−05 | −6.9673E−07 | 1.5505E−08 |
| S11 | −7.2588E+00 | −1.2020E−05 | 4.7200E−07 | −8.0207E−09 |
| S12 | −7.5252E+00 | −2.0251E−06 | 5.3252E−08 | −5.6470E−10 |

TABLE 12

| | Wide | Tele | |
|---|---|---|---|
| Fno | 1.94 | 3.06 | |
| 2ω (°) | 47.74 | 24.12 | |
| f (mm) | 9.237 | 18.455 | |
| | Wide | Tele | Contracted |
| TTL (mm) | 19.600 | 19.600 | 8.331 |
| LB (mm) | 1.742 | 10.648 | 1.510 |
| f1 (mm) | −16.937 | | |
| f2 (mm) | 5.808 | | |
| f3 (mm) | −7.102 | | |
| f4 (mm) | 12.327 | | |
| fG5 (mm) | −28.472 | | |
| f5 (mm) | 27.286 | | |
| f6 (mm) | −13.481 | | |
| IH (mm) | 4.000 | | |
| Zoom ratio | 1.998 | | |

As shown in Table 21, Embodiment 3 satisfies the conditions (1) to (9).

Figure 8:
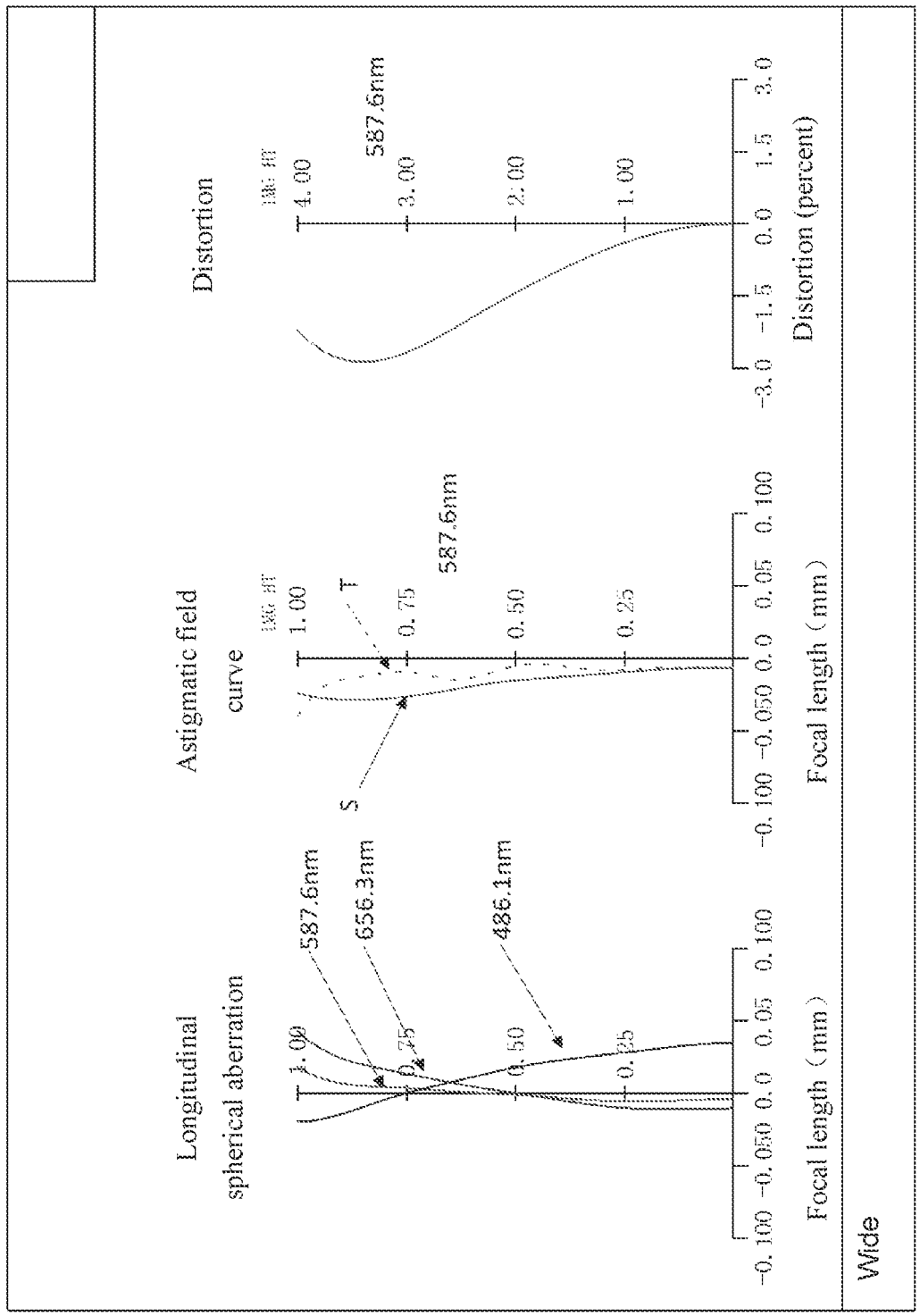
FIG. 8 is a schematic diagram showing longitudinal spherical aberrations, astigmatic field curves and distortions of the zoom lens LA at the wide angle end according to Embodiment 3 of the present disclosure.
Figure 9:
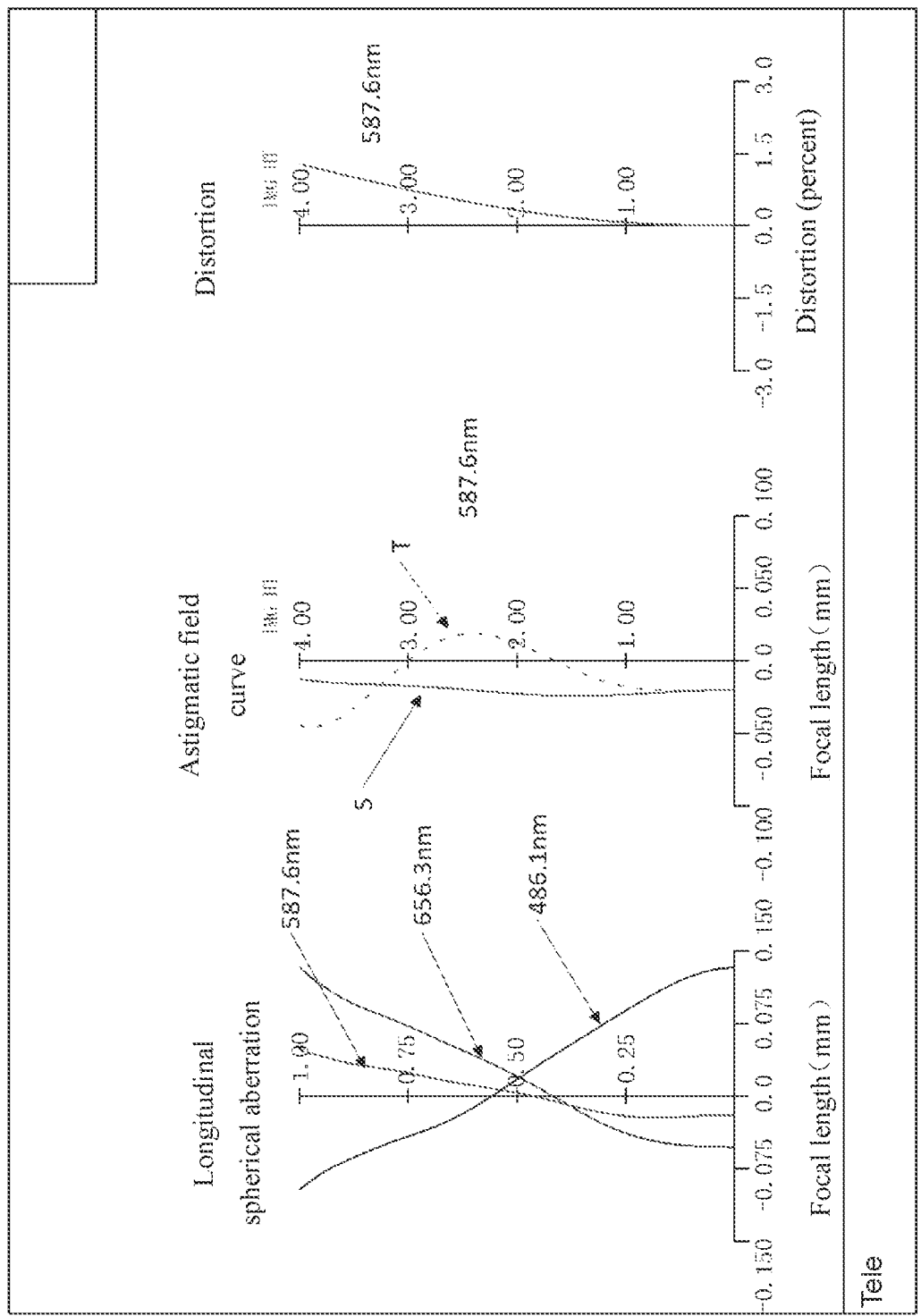
FIG. 9 is a schematic diagram showing longitudinal spherical aberrations, astigmatic field curves and distortions of the zoom lens LA at the telephoto end according to Embodiment 3 of the present disclosure.

FIG. 8 is a schematic diagram showing longitudinal spherical aberrations, astigmatic field curves and distortions of the zoom lens LA at the wide angle end according to Embodiment 3 of the present disclosure. FIG. 9 is a schematic diagram showing longitudinal spherical aberrations, astigmatic field curves and distortions of the zoom lens LA at the telephoto end according to Embodiment 3 of the present disclosure. It can be known that the zoom lens becomes miniature with TTL equal to 8.331 and becomes bright with Fno equal to 1.94 and has a zoom ratio equal to 1.998 at the wide angle end and has excellent optical performance as shown in FIG. 8 and FIG. 9 in Embodiment 3 of the present disclosure.

Embodiment 4

Figure 10:
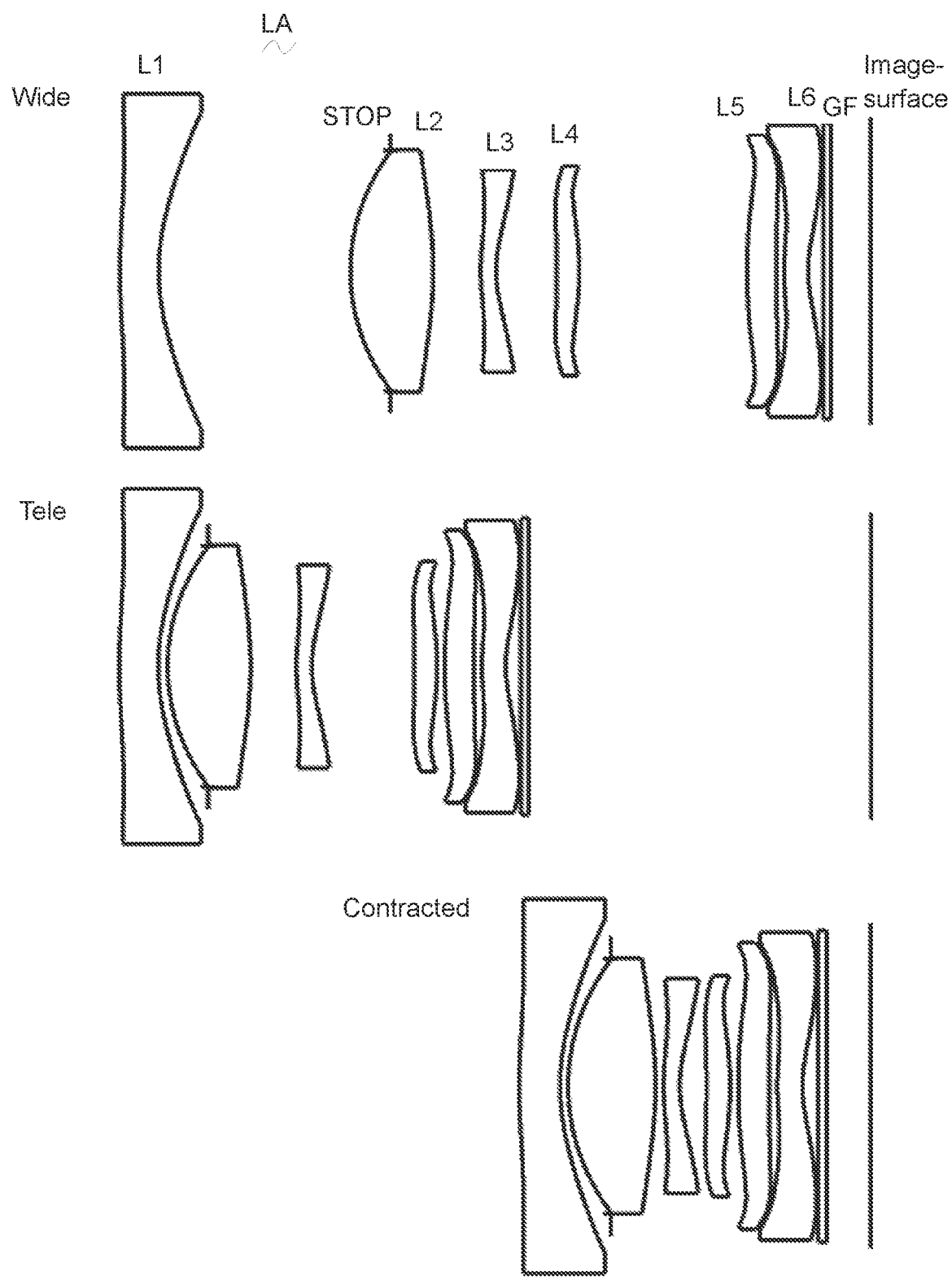
FIG. 10 is a schematic diagram of a structure of a zoom lens LA according to Embodiment 4 of the present disclosure.

FIG. 10 is a schematic diagram of a structure of the zoom LA according to Embodiment 4 of the present disclosure. Table 13 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 14 shows the values of A, B, C, D and E when contracted or photographing. Table 15 shows the conic coefficient k and the aspheric surface coefficients. Table 16 shows values of Fno, 2ω, f, TTL, LB, f1, f2, f3, f4, fG5, f5, f6, IH and zoom ratio.

TABLE 13

| | | R | d | | nd | vd | effective radius (mm) |
|---|---|---|---|---|---|---|---|
| S1 | R1 | 14.98234 | d1 | 1.013 | nd1 1.4959 | v1 81.655 | 4.634 |
| S2 | R2 | 5.26985 | D12 d2 | A | | | 4.122 |
| Stop | | ∞ | d3 | −1.047 | | | 3.153 |
| S3 | R3 | 5.04601 | d4 | 2.161 | nd2 1.5806 | v2 60.079 | 3.162 |
| S4 | R4 | −9.92541 | d5 | B | | | 3.081 |
| S5 | R5 | 5.74344 | d6 | 0.400 | nd3 1.6700 | v3 19.392 | 2.653 |
| S6 | R6 | 2.98243 | d7 | C | | | 2.555 |
| S7 | R7 | −32.32706 | d8 | 0.589 | nd4 1.5438 | v4 56.029 | 2.734 |
| S8 | R8 | −7.62534 | d9 | D | | | 2.712 |
| S9 | R9 | 17.33172 | d10 | 0.759 | nd5 1.6700 | v5 19.392 | 3.439 |
| S10 | R10 | 34.53207 | d11 | 0.205 | | | 3.552 |
| S11 | R11 | 5.78882 | d12 | 0.625 | nd6 1.4959 | v6 81.655 | 3.559 |
| S12 | R12 | 3.30504 | d13 | 0.390 | | | 3.810 |
| S13 | R13 | ∞ | d14 | 0.210 | ndg 1.5168 | vg 64.167 | 3.838 |
| S14 | R14 | ∞ | d15 | E | | | 3.860 |

Reference wavelength = 587.6 nm

TABLE 14

| | Photographing | | |
|---|---|---|---|
| | Wide | Tele | Contracted |
| A | 6.050 | 1.297 | 1.247 |
| B | 1.240 | 1.194 | 0.200 |
| C | 1.581 | 2.678 | 0.660 |
| D | 4.383 | 0.200 | 0.200 |
| E | 1.042 | 8.927 | 0.890 |

TABLE 15

| | Conic coefficient | Aspheric surface coefficients | | | |
|---|---|---|---|---|---|
| | k | A4 | A6 | A8 | A10 |
| S1 | 0.0000E+00 | −3.7536E−03 | 2.2036E−04 | −1.0070E−05 | 4.2179E−07 |
| S2 | 0.0000E+00 | −5.1108E−03 | 2.7540E−04 | −1.8794E−05 | 1.1984E−06 |
| S3 | −5.1704E−01 | 3.5277E−04 | 3.0334E−05 | −9.5870E−06 | 2.3186E−06 |
| S4 | 0.0000E+00 | 2.5600E−03 | 4.2044E−05 | −4.4946E−05 | 8.1661E−06 |
| S5 | 0.0000E+00 | −3.3766E−02 | 8.2127E−03 | −1.7569E−03 | 2.7773E−04 |
| S6 | −4.8937E+00 | −2.2706E−02 | 7.0416E−03 | −1.7633E−03 | 3.2056E−04 |
| S7 | 0.0000E+00 | 4.7585E−04 | 6.9018E−04 | −7.4376E−06 | 7.4010E−06 |
| S8 | −1.1589E+01 | 1.1854E−04 | 9.4606E−04 | −7.7468E−06 | 1.1519E−06 |
| S9 | 0.0000E+00 | 3.4171E−03 | −1.3641E−03 | 4.1669E−04 | −8.5975E−05 |
| S10 | 0.0000E+00 | −5.7698E−03 | 1.7512E−03 | −1.8602E−04 | −5.6310E−06 |
| S11 | −4.0247E+00 | −4.3700E−02 | 1.0875E−02 | −1.7947E−03 | 2.0457E−04 |
| S12 | −7.4985E+00 | −1.8283E−02 | 4.0547E−03 | −6.2900E−04 | 6.4181E−05 |

| | Conic coefficient | Aspheric surface coefficients | | |
|---|---|---|---|---|
| | k | A12 | A14 | A16 |
| S1 | 0.0000E+00 | −1.3804E−08 | 2.8803E−10 | −2.7601E−12 |
| S2 | 0.0000E+00 | −6.1311E−08 | 1.9359E−09 | −2.8147E−11 |
| S3 | −5.1704E−01 | −3.3809E−07 | 2.5780E−08 | −8.4890E−10 |
| S4 | 0.0000E+00 | −8.5217E−07 | 4.8947E−08 | −1.2589E−09 |
| S5 | 0.0000E+00 | −2.8852E−05 | 1.7428E−06 | −4.5614E−08 |
| S6 | −4.8937E+00 | −3.7570E−05 | 2.5214E−06 | −7.1912E−08 |
| S7 | 0.0000E+00 | −8.7561E−07 | −1.0308E−07 | 1.0630E−08 |
| S8 | −1.1589E+01 | 1.9139E−06 | −4.8498E−07 | 2.7389E−08 |
| S9 | 0.0000E+00 | 9.3294E−06 | −5.2187E−07 | 1.1906E−08 |
| S10 | 0.0000E+00 | 2.2998E−06 | −1.7674E−07 | 4.8751E−09 |
| S11 | −4.0247E+00 | −1.5144E−05 | 6.1970E−07 | −1.0232E−08 |
| S12 | −7.4985E+00 | −4.0456E−06 | 1.3823E−07 | −1.9138E−09 |

TABLE 16

| | Wide | Tele |
|---|---|---|
| Fno | 1.96 | 3.10 |
| 2ω (°) | 46.99 | 24.12 |
| f (mm) | 9.253 | 18.526 |

| | Wide | Tele | Contracted |
|---|---|---|---|
| TTL (mm) | 19.600 | 19.600 | 8.501 |
| LB (mm) | 1.642 | 9.527 | 1.490 |
| f1 (mm) | −16.979 | | |
| f2 (mm) | 6.084 | | |
| f3 (mm) | −9.831 | | |
| f4 (mm) | 18.198 | | |
| fG5 (mm) | −27.090 | | |
| f5 (mm) | 51.027 | | |
| f6 (mm) | −16.945 | | |
| IH (mm) | 4.000 | | |
| Zoom ratio | 2.002 | | |

As shown in Table 21, Embodiment 4 satisfies the conditions (1) to (9).

Figure 11:
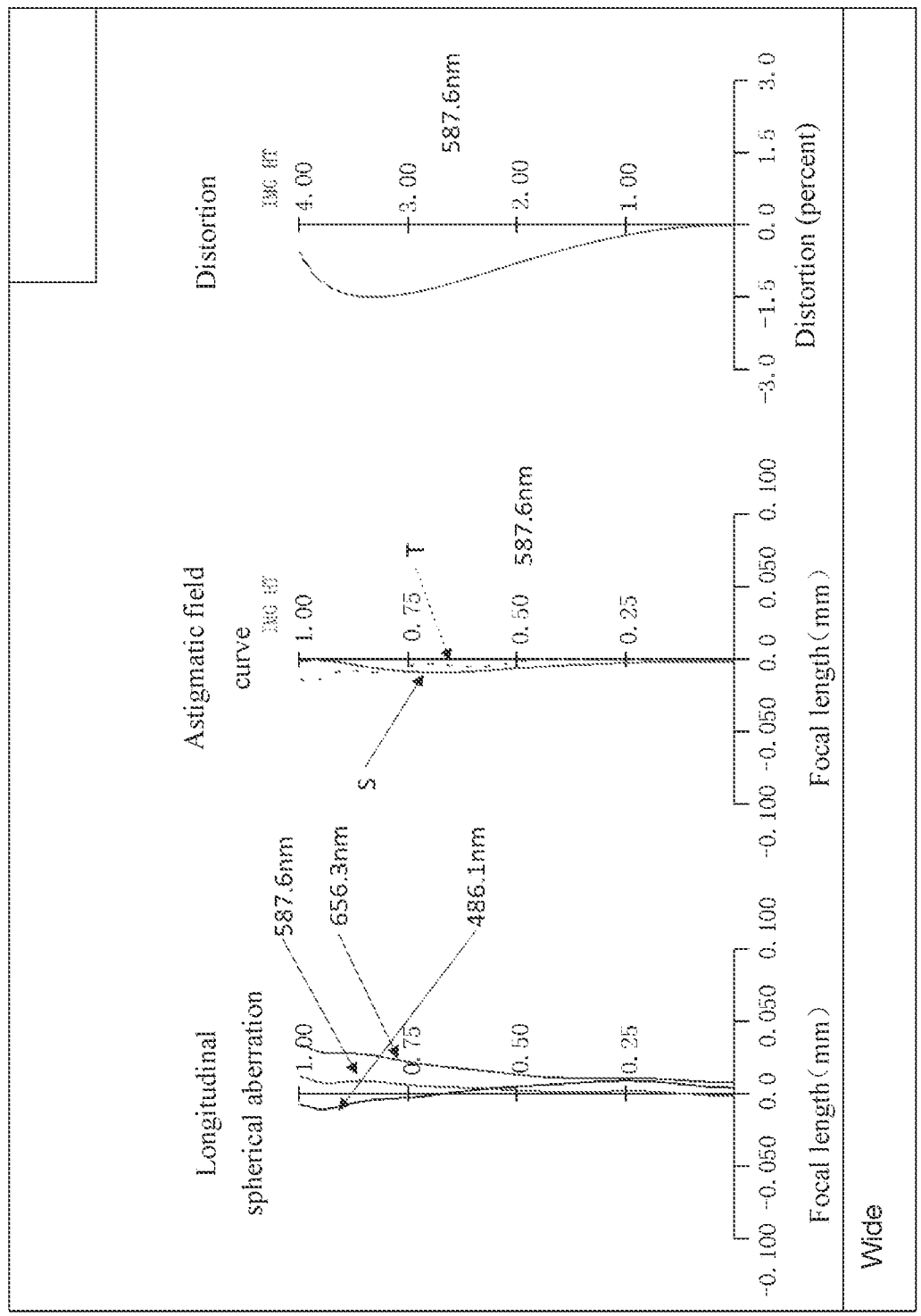
FIG. 11 is a schematic diagram showing longitudinal spherical aberrations, astigmatic field curves and distortions of the zoom lens LA at the wide angle end according to Embodiment 4 of the present disclosure.
Figure 12:
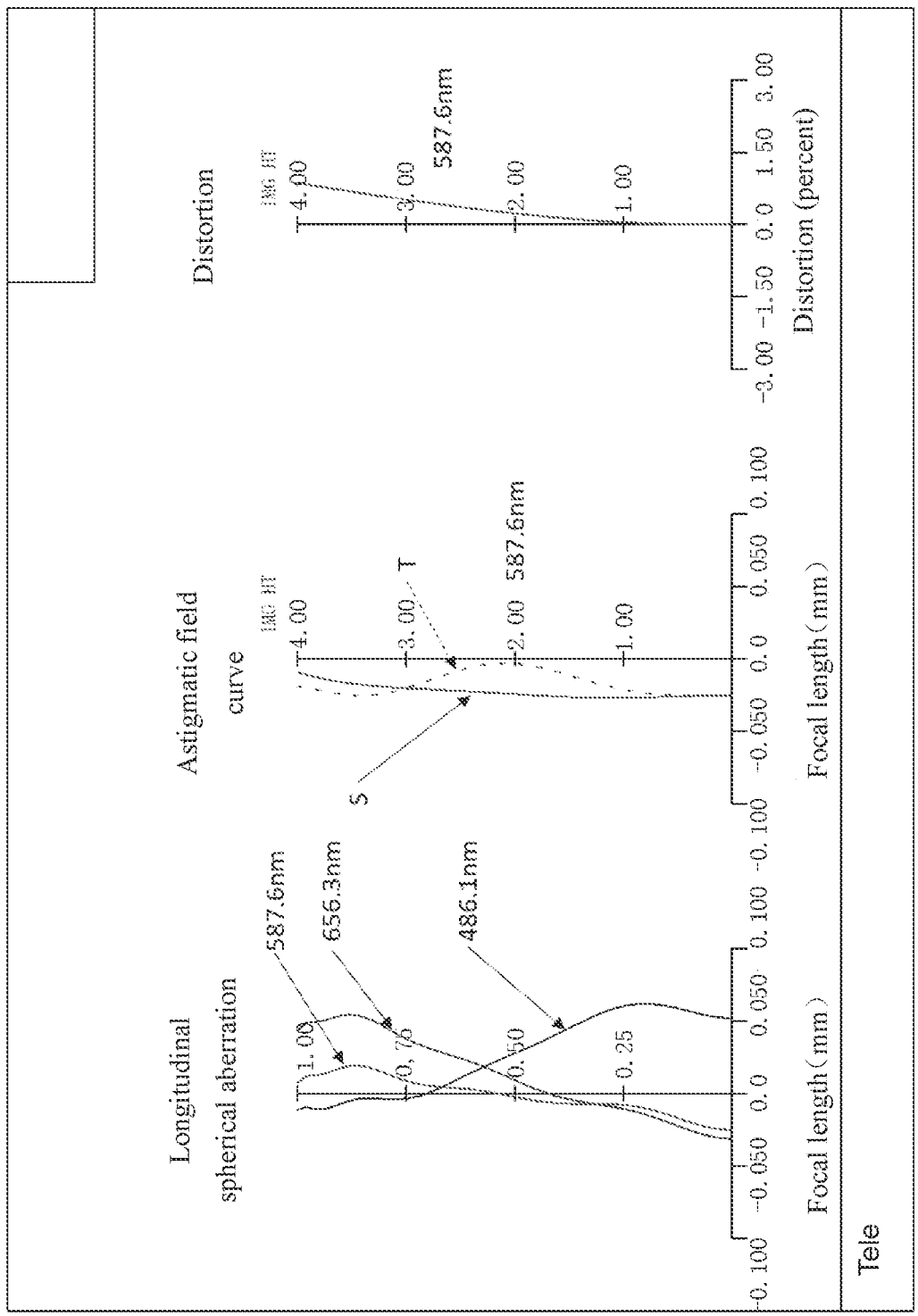
FIG. 12 is a schematic diagram showing longitudinal spherical aberrations, astigmatic field curves and distortions of the zoom lens LA at the telephoto end according to Embodiment 4 of the present disclosure.

FIG. 11 is a schematic diagram showing longitudinal spherical aberrations, astigmatic field curves and distortions of the zoom lens LA at the wide angle end according to Embodiment 4 of the present disclosure. FIG. 12 is a schematic diagram showing longitudinal spherical aberrations, astigmatic field curves and distortions of the zoom lens LA at the telephoto end according to Embodiment 4 of the present disclosure. It can be known that the zoom lens becomes miniature with TTL equal to 8.501 and becomes bright with Fno equal to 1.96 and has a zoom ratio equal to 2.002 at the wide angle end and has excellent optical performance as shown in FIG. 11 and FIG. 12 in Embodiment 4 of the present disclosure.

Embodiment 5

Figure 13:
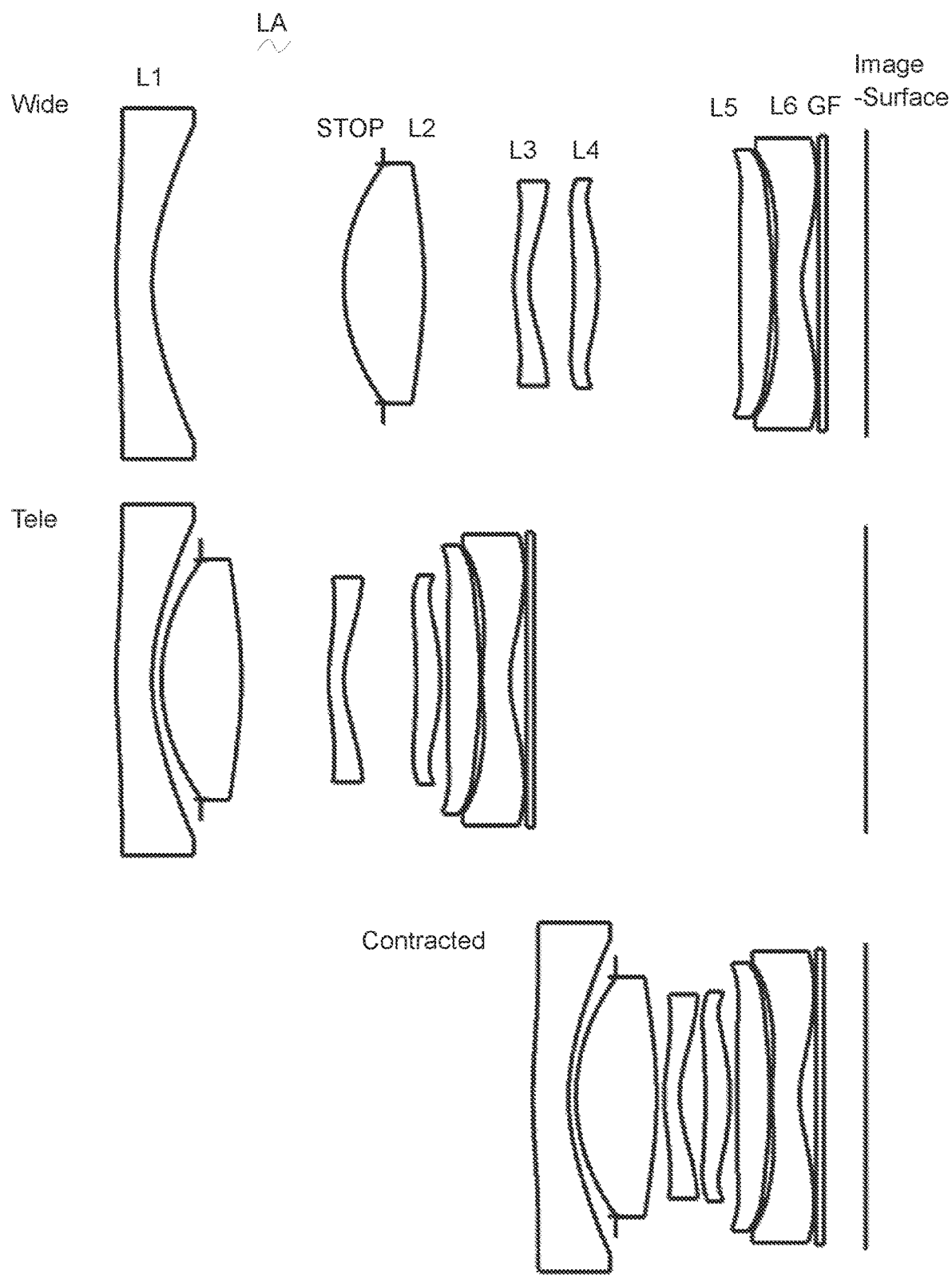
FIG. 13 is a schematic diagram of a structure of a zoom lens LA according to Embodiment 5 of the present disclosure.

FIG. 13 is a schematic diagram of a structure of the zoom LA according to Embodiment 5 of the present disclosure. Table 17 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 18 shows the values of A, B, C, D and E when contracted or photographing. Table 19 shows the conic coefficient k and the aspheric surface coefficients. Table 20 shows values of Fno, 2ω, f, TTL, LB, f1, f2, f3, f4, fG5, f5, f6, IH and zoom ratio.

TABLE 17

|  |  | R | d |  | nd |  | vd | effective radius (mm) |
|---|---|---|---|---|---|---|---|---|
| S1 | R1 | 14.54031 | d1 | 0.932 | nd1 | 1.5264 | v1 76.860 | 4.584 |
| S2 | R2 | 5.48677 | D12 d2 | A |  |  |  | 4.128 |
| Stop |  | ∞ | d3 | −1.020 |  |  |  | 3.134 |
| S3 | R3 | 5.00546 | d4 | 2.099 | nd2 | 1.5264 | v2 76.860 | 3.144 |
| S4 | R4 | −11.41165 | d5 | B |  |  |  | 3.107 |
| S5 | R5 | 4.72445 | d6 | 0.400 | nd3 | 1.6700 | v3 19.392 | 2.680 |
| S6 | R6 | 2.80958 | d7 | C |  |  |  | 2.648 |
| S7 | R7 | −28.21289 | d8 | 0.639 | nd4 | 1.5438 | v4 56.029 | 2.747 |
| S8 | R8 | −6.01316 | d9 | D |  |  |  | 2.724 |
| S9 | R9 | −35.22355 | d10 | 0.847 | nd5 | 1.6700 | v5 19.392 | 3.413 |
| S10 | R10 | −11.12353 | d11 | 0.050 |  |  |  | 3.516 |
| S11 | R11 | 6.55954 | d12 | 0.725 | nd6 | 1.5264 | v6 76.860 | 3.517 |
| S12 | R12 | 2.95172 | d13 | 0.430 |  |  |  | 3.811 |
| S13 | R13 | ∞ | d14 | 0.210 | ndg | 1.5168 | vg 64.167 | 3.843 |
| S14 | R14 | ∞ | d15 | E |  |  |  | 3.865 |

Reference wavelength = 587.6 nm

TABLE 18

| | Photographing | | |
|---|---|---|---|
| | Wide | Tele | Contracted |
| A | 6.028 | 1.271 | 1.221 |
| B | 2.355 | 2.272 | 0.200 |
| C | 1.155 | 1.876 | 0.680 |
| D | 3.713 | 0.200 | 0.200 |
| E | 1.037 | 8.668 | 0.890 |

TABLE 20

| | Wide | Tele | |
|---|---|---|---|
| Fno | 1.96 | 3.13 | |
| 2ω (°) | 46.73 | 23.91 | |
| f (mm) | 9.254 | 18.635 | |
| | Wide | Tele | Contracted |
| TTL (mm) | 19.600 | 19.600 | 8.503 |
| LB (mm) | 1.677 | 9.308 | 1.530 |

TABLE 19

| | Conic coefficient | Aspheric surface coefficients | | | |
|---|---|---|---|---|---|
| | k | A4 | A6 | A8 | A10 |
| S1 | 0.0000E+00 | −3.4372E−03 | 1.9939E−04 | −8.9861E−06 | 3.3833E−07 |
| S2 | 0.0000E+00 | −4.5696E−03 | 2.3843E−04 | −1.4091E−05 | 6.7722E−07 |
| S3 | −6.1134E−01 | 1.2020E−04 | 4.7405E−05 | −1.4912E−05 | 3.4106E−06 |
| S4 | 0.0000E+00 | 1.5507E−03 | −1.2703E−05 | −2.3469E−06 | 2.9676E−07 |
| S5 | 0.0000E+00 | −2.9557E−02 | 4.9607E−03 | −7.3211E−04 | 7.3824E−05 |
| S6 | −4.0488E+00 | −1.8215E−02 | 3.6392E−03 | −5.8151E−04 | 5.8514E−05 |
| S7 | 0.0000E+00 | −3.2762E−03 | 6.4781E−04 | −1.1358E−04 | 7.8336E−05 |
| S8 | −8.8647E+00 | −4.1463E−03 | 9.4507E−04 | 2.3621E−05 | −3.4675E−06 |
| S9 | 0.0000E+00 | 9.1110E−03 | −2.6888E−03 | 6.0171E−04 | −8.8958E−05 |
| S10 | 0.0000E+00 | 8.4438E−03 | −3.4629E−03 | 9.4445E−04 | −1.3749E−04 |
| S11 | −5.7915E+00 | −3.2471E−02 | 4.9171E−03 | −3.0991E−04 | 9.4133E−07 |
| S12 | −6.7555E+00 | −1.7289E−02 | 3.2197E−03 | −4.1572E−04 | 3.5257E−05 |

| | Conic coefficient | Aspheric surface coefficients | | |
|---|---|---|---|---|
| | k | A12 | A14 | A16 |
| S1 | 0.0000E+00 | −9.3236E−09 | 1.6970E−10 | −1.5497E−12 |
| S2 | 0.0000E+00 | −2.7519E−08 | 8.1238E−10 | −1.2348E−11 |
| S3 | −6.1134E−01 | −4.4619E−07 | 3.0616E−08 | −8.9323E−10 |
| S4 | 0.0000E+00 | −6.9638E−08 | 8.0230E−09 | −3.6431E−10 |
| S5 | 0.0000E+00 | −5.1003E−06 | 2.6712E−07 | −8.2591E−09 |
| S6 | −4.0488E+00 | −3.4616E−06 | 1.3256E−07 | −2.9525E−09 |
| S7 | 0.0000E+00 | −1.2556E−05 | 7.3534E−07 | −1.3887E−08 |
| S8 | −8.8647E+00 | 6.8276E−06 | −1.2375E−06 | 5.8817E−08 |
| S9 | 0.0000E+00 | 7.5377E−06 | −3.4555E−07 | 6.7229E−09 |
| S10 | 0.0000E+00 | 1.0482E−05 | −4.1404E−07 | 6.8885E−09 |
| S11 | −5.7915E+00 | 4.1863E−07 | 3.3193E−09 | −4.5789E−10 |
| S12 | −6.7555E+00 | −1.9038E−06 | 5.7222E−08 | −6.9007E−10 |

TABLE 20-continued

| | |
|---|---|
| f1 (mm) | −17.356 |
| f2 (mm) | 6.914 |
| f3 (mm) | −11.292 |
| f4 (mm) | 13.911 |
| fG5 (mm) | −21.439 |
| f5 (mm) | 23.926 |
| f6 (mm) | −10.954 |
| IH (mm) | 4.000 |
| Zoom ratio | 2.014 |

As shown in Table 21, Embodiment 5 satisfies the conditions (1) to (9).

Figure 14:
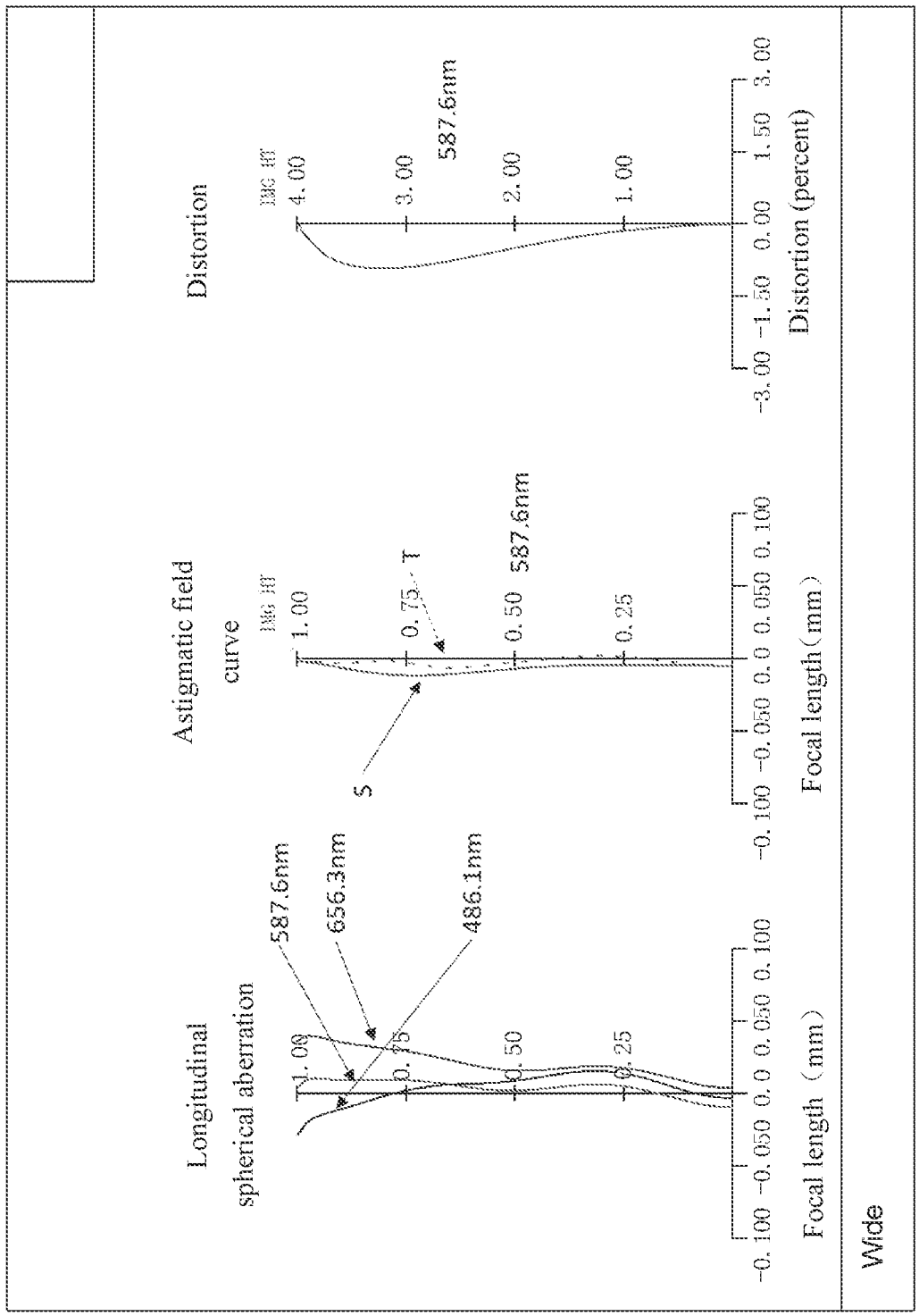
FIG. 14 is a schematic diagram showing longitudinal spherical aberrations, astigmatic field curves and distortions of the zoom lens LA at the wide angle end according to Embodiment 5 of the present disclosure.
Figure 15:
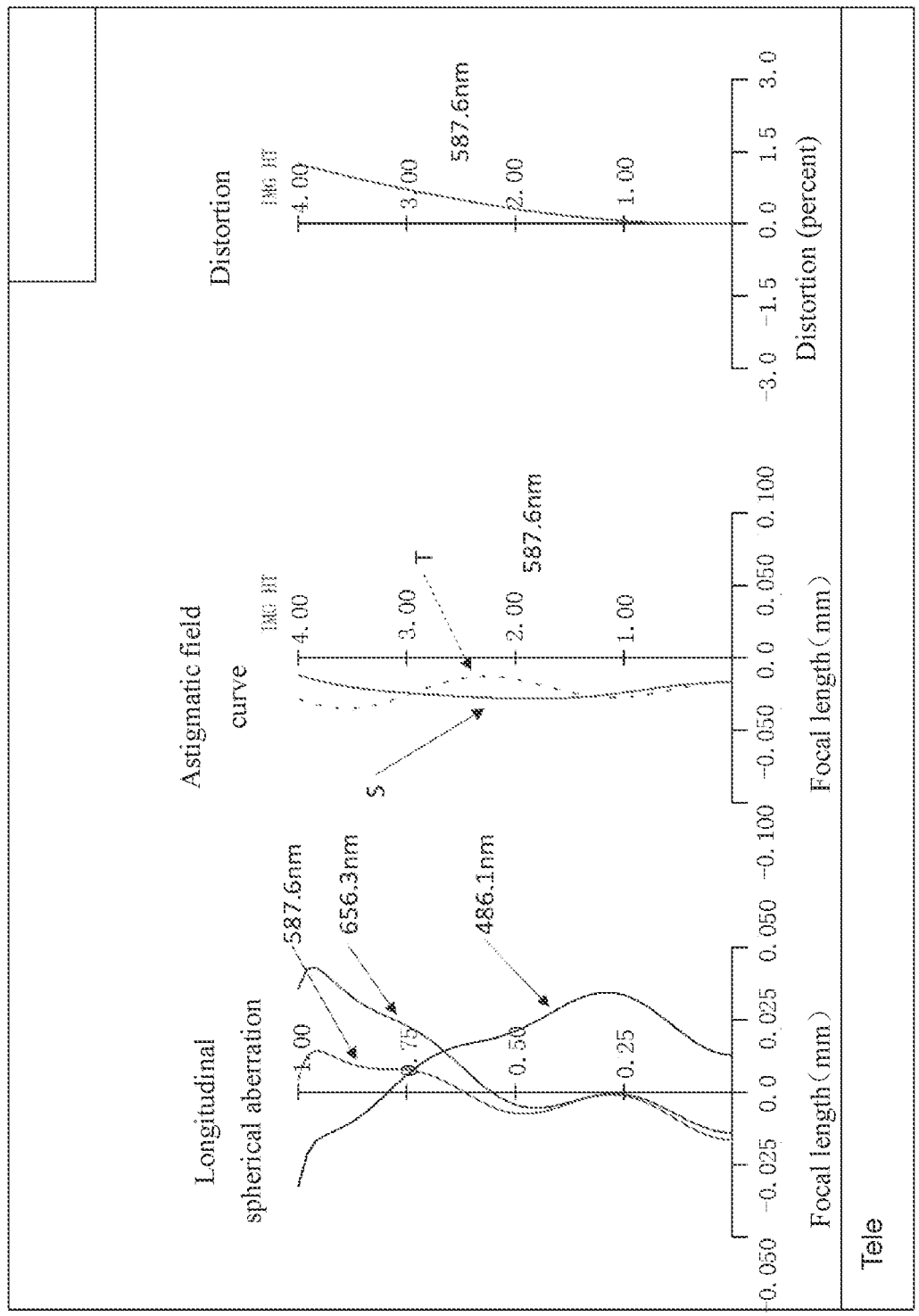
FIG. 15 is a schematic diagram showing longitudinal spherical aberrations, astigmatic field curves and distortions of the zoom lens LA at the telephoto end according to Embodiment 5 of the present disclosure.

FIG. 14 is a schematic diagram showing longitudinal spherical aberrations, astigmatic field curves and distortions of the zoom lens LA at the wide angle end according to Embodiment 5 of the present disclosure. FIG. 15 is a schematic diagram showing longitudinal spherical aberrations, astigmatic field curves and distortions of the zoom lens LA at the telephoto end according to Embodiment 5 of the present disclosure. It can be known that the zoom lens becomes miniature with TTL equal to 8.503 and becomes bright with Fno equal to 1.96 and has a zoom ratio equal to 2.014 at the wide angle end and has excellent optical performance as shown in FIG. 14 and FIG. 15 in Embodiment 5 of the present disclosure.

Table 21 shows various parameters of Embodiments 1, 2, 3, 4 and 5 and values corresponding to the parameters specified in the above conditions (1) to (9).

TABLE 21

| | Embodiment 1 | Embodiment 2 | Embodiment 3 | Embodiment 4 | Embodiment 5 | Memo |
|---|---|---|---|---|---|---|
| f_Tele/f_Wide | 2.000 | 2.000 | 1.998 | 2.002 | 2.014 | Condition (1) |
| LB_Tele/LB_Wide | 6.191 | 4.799 | 6.111 | 5.802 | 5.551 | Condition (2) |
| v1 | 81.655 | 81.655 | 81.655 | 81.655 | 76.860 | Condition (3) |
| v2 | 60.079 | 60.079 | 60.079 | 60.079 | 76.860 | Condition (4) |
| v6 | 81.655 | 81.655 | 81.655 | 81.655 | 76.860 | Condition (5) |
| D12_Wide/D12_Tele | 19.992 | 11.876 | 15.480 | 19.990 | 19.991 | Condition (6) |
| d5_Wide/d5_Tele | 1.189 | 0.691 | 1.021 | 1.038 | 1.036 | Condition (7) |
| d7_Wide/d7_Tele | 0.632 | 0.740 | 0.715 | 0.591 | 0.616 | Condition (8) |
| d9_Wide/d9_Tele | 22.490 | 15.011 | 22.490 | 21.914 | 18.565 | Condition (9) |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A zoom lens comprising, from an object side to an image side in sequence: a first lens having a negative refractive power, a second lens having a positive refractive power, a third lens having a negative refractive power, a fourth lens having a positive refractive power, a fifth lens group having a negative refractive power; wherein
distances between adjacent two of the first lens, the second lens, the third lens, the fourth lens and the fifth lens group are variable in the direction of an optical axis;
the fifth lens group comprises a fifth lens having a positive refractive power and a sixth lens having a negative refractive power;
the zoom lens satisfies conditions of:

| | |
|---|---|
| f_Tele/f_Wide > 1.8; | (1) |
| 4.78 ≤ LB_Tele/LB_Wide ≤ 6.20; | (2) |
| 76.00 ≤ v1 ≤ 82.00; | (3) |
| 58.00 ≤ v2 ≤ 78.00; and | (4) |
| 76.00 ≤ v6 ≤ 82.00; | (5) | where
f_Wide denotes a focal length of the zoom lens at the wide angle end;
f_Tele denotes a focal length of the zoom lens at the telephoto end;
LB_Wide denotes an on-axis distance from an image-side surface of the sixth lens to an image surface at the wide angel end;
LB_Tele denotes an on-axis distance from an image-side surface of the sixth lens to an image surface at the telephoto end;
v1 denotes an abbe number of the first lens;
v2 denotes an abbe number of the second lens; and
v6 denotes an abbe number of the sixth lens.

2. The zoom lens according to claim 1, wherein the zoom lens further satisfies a condition of:

$$10.00 \le D12\_Wide/D12\_Tele \le 20.00; \qquad (6)$$

where
D12_Wide denotes an on-axis distance from an image-side surface of the first lens to an object-side surface of the second lens at the wide angle end; and
D12_Tele denotes an on-axis distance from an image-side surface of the first lens to an object-side surface of the second lens at the telephoto end.

3. The zoom lens according to claim 1, wherein the zoom lens further satisfies a condition of:

$$0.68 \le d5\_Wide/d5\_Tele \le 1.20; \qquad (7)$$

where
d5_Wide denotes an on-axis distance from an image-side surface of the second lens to an object-side surface of the third lens at the wide angle end; and
d5_Tele denotes an on-axis distance from an image-side surface of the second lens to an object-side surface of the third lens at the telephoto end.

4. The zoom lens according to claim 1, wherein the zoom lens further satisfies a condition of:

$$0.55 \leq d7\_Wide/d7\_Tele \leq 0.75; \quad (8)$$

where
- d7 _Wide denotes an on-axis distance from an image-side surface of the third lens to an object-side surface of the fourth lens at the wide angle end; and
- d7 _Tele denotes an on-axis distance from an image-side surface of the third lens to an object-side surface of the fourth lens at the telephoto end.

5. The zoom lens according to claim 1, wherein the zoom lens further satisfies a condition of:

$$15.00 \leq d9\_Wide/d9\_Tele \leq 22.50; \quad (9)$$

where
- d9 _Wide denotes an on-axis distance from an image-side surface of the fourth lens to an object-side surface of the fifth lens at the wide angle end; and
- d9 _Tele denotes an on-axis distance from an image-side surface of the fourth lens to an object-side surface of the fifth lens at the telephoto end.

* * * * *